(12) United States Patent
Levy

(10) Patent No.: US 12,088,437 B2
(45) Date of Patent: Sep. 10, 2024

(54) DYNAMIC SHIFT IN OUTPUT OF SERIAL AND PARALLEL SCRAMBLERS AND DESCRAMBLERS

(71) Applicant: Microsoft Technology Licensing, LLC, Redmond, WA (US)

(72) Inventor: Asaf Levy, Hod Hasharon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/451,586

(22) Filed: Aug. 17, 2023

(65) Prior Publication Data

US 2023/0396469 A1    Dec. 7, 2023

Related U.S. Application Data

(63) Continuation of application No. 17/727,324, filed on Apr. 22, 2022, now Pat. No. 11,777,770.

(51) Int. Cl.
*H04L 25/03* (2006.01)
*H04L 25/49* (2006.01)

(52) U.S. Cl.
CPC .... *H04L 25/03872* (2013.01); *H04L 25/4902* (2013.01); *H04L 25/4904* (2013.01); *H04L 2025/03356* (2013.01)

(58) Field of Classification Search
CPC ..... H04L 2025/03356; H04L 25/03866; H04L 25/03872; H04L 25/4902; H04L 25/4904
See application file for complete search history.

(56) References Cited

U.S. PATENT DOCUMENTS

2004/0130466 A1* 7/2004 Lu ............................ H04J 13/10
                                                         708/252
2019/0371227 A1* 12/2019 Choi ........................ G09G 5/005

* cited by examiner

*Primary Examiner* — Nader Bolourchi
(74) *Attorney, Agent, or Firm* — Weaver IP L.L.C.

(57) ABSTRACT

Methods, systems are provided for reconfiguring the position of a first tap in a descrambler circuit LFSR after the LFSR has been trained and synchronized with a corresponding scrambler circuit LFSR. A data path from the second tap position to the descrambler output by-passes logic elements located in the data path from the first tap to the descrambler output, thereby reducing delay in the descrambler circuit after the reconfiguration (i.e., the "lock-shift" operation). The tap position change may be communicated by a mode manager to a corresponding scrambler circuit, for applying a matching reconfiguration in the scrambler circuit, either directly via an I/O line or indirectly. The indirect route includes in-band transmissions between two ICs with two sets of self-synchronizing scrambler/descrambler pairs, and is based on monitored receiver LFSR output signals that indicate when a scrambler/descrambler pair is synchronized or whether the output of a descrambler circuit comprises descrambled data.

20 Claims, 20 Drawing Sheets

1100

1102 Detect, by a first mode manager, synchronization of a first receiver LFSR and a first transmitter LFSR during a training mode, wherein a first sequence of training bits is tapped at a first port of the first receiver LFSR through which the first sequence of training bits is shifted

1104 Transmit, by the first mode manager, a lock-shift signal to the first receiver LFSR based on the detected synchronization, wherein the first receiver LFSR is reconfigured to tap a second port of the first receiver LFSR in response to receiving the lock-shift signal

1106 Transmit, by the first mode manager, a start-training signal to a second transmitter LFSR, wherein the second transmitter LFSR is configured to transmit a second sequence of training bits to a second receiver LFSR in response to receiving the start-training signal

1108 Detect, by a second mode manager, synchronization of the second receiver LFSR and the second transmitter LFSR during a training mode, wherein the second sequence of training bits is tapped at a first port of the second receiver LFSR through which the second sequence of training bits is shifted

1110 Transmit, by the second mode manager, a lock-shift signal to the second receiver LFSR, wherein the second receiver LFSR is reconfigured to tap a second port of the second receiver LFSR in response to receiving the lock-shift signal

1112 Transmit, by the second mode manager, a lock-shift signal to the first transmitter LFSR, wherein the first transmitter LFSR is reconfigured to tap a second port of the first transmitter LFSR in response to receiving the lock-shift signal

FIG. 11A

DYNAMIC SHIFT IN OUTPUT OF SERIAL AND PARALLEL SCRAMBLERS AND DESCRAMBLERS

CROSS-REFERENCE TO RELATED APPLICATION

This application is a continuation of and claims priority to U.S. patent application Ser. No. 17/727,324 entitled "DYNAMIC SHIFT IN OUTPUTS OF SERIAL AND PARALLEL SCRAMBLERS AND DESCRAMBLERS," which was filed on Apr. 22, 2022, now U.S. Pat. No. 11,777,770, and is herein incorporated by reference in its entirety

BACKGROUND

Integrated circuits (ICs) that communicate via high frequency channels often employ scrambling and descrambling circuits on the transmitting and receiving sides, respectively. This is done because high frequency signals that carry repeating data tend to create electro-magnetic interference. The act of scrambling repetitive data helps to alleviate the narrow band interference. A descrambler may be used to extract the original data by performing an opposite action. Digital data is often scrambled by a scrambler using linear feedback shift registers (LFSRs) that include some number of memory elements that are each capable of saving one bit of data. Each bit of data is shifted from one memory element to another memory element creating a series. The LFSR may digitally implement one or more polynomials, and because the most desirable polynomials to use are standard in the academic sense, these polynomials, and the LFSR structures that implement them, are standard in industry as well. Most scrambling circuits use the same logic and LFSRs.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided for a descrambler circuit configured to perform a lock-shift operation to reduce the amount of logic through which received data passes, which enables faster receipt of transmitted data.

In one implementation, a first descrambler circuit comprises a first mode manager and a first receiver having a data input port. The first receiver is communicatively coupled to a first transmitter of a first scrambler circuit. The first receiver is configured to receive a first bit sequence from the first scrambler circuit. The first bit sequence is tapped at a first port of a first transmitter LFSR that includes a first plurality of memory elements in the first scrambler circuit, through which the first bit sequence is shifted. The first descrambler circuit further comprises a first receiver LFSR comprising a second plurality of memory elements. The first receiver LFSR is configured to shift the received first bit sequence through the second plurality of memory elements, tap a first port of the first receiver LFSR, and generate, at a first output node of the first receiver LFSR, a first output signal configured as a sequential bitwise combination of the received first bit sequence and a bit sequence comprising a sequential bitwise combination of bit sequences tapped from the first port of the first receiver LFSR. The first mode manager is configured to detect synchronization between the first transmitter LFSR and the first receiver LFSR based on the first output signal, and cause the tap to change from the first port of the first receiver LFSR to a second port of the first receiver LFSR such that the second port is displaced relative to the first port. The first receiver LFSR is further configured to generate, at a second output node of the first receiver LFSR, a second output signal configured as a sequential bitwise combination of a received second bit sequence and a bit sequence tapped from the second port of the first receiver LFSR. A signal propagation time from the second port of the first receiver LFSR to the second output node of the first receiver LFSR is less than the signal propagation time from the first port of the first receiver LFSR to the first output node of the first receiver LFSR.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 11A and 11B comprise a flowchart of a method for implementing fast scrambling and fast descrambling operations in two ICs comprising serial or parallel scrambler-descrambler circuits, according to an example embodiment.

Figure 1:
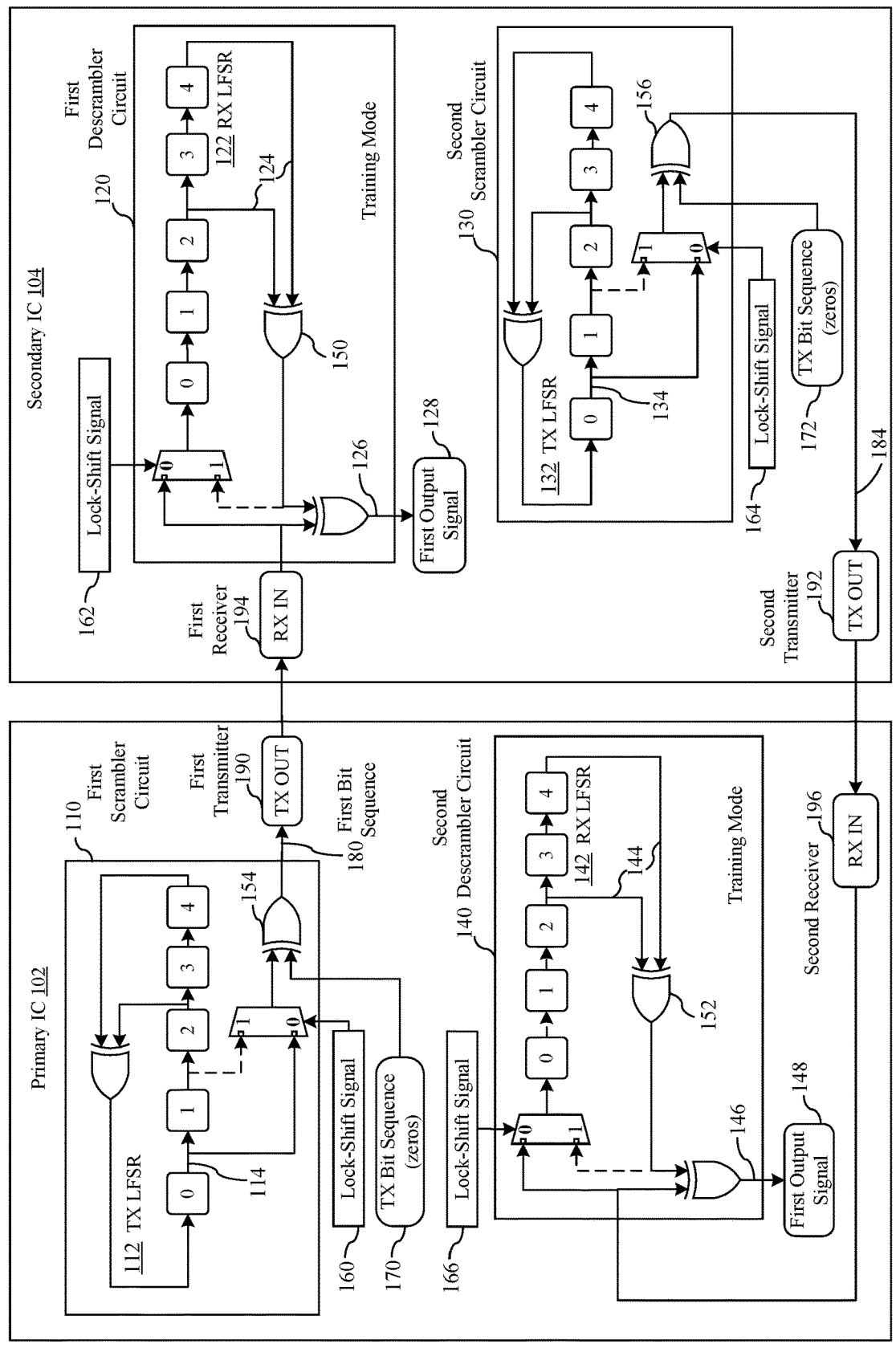
FIG. 1 is block diagram of a system including pair of integrated circuits (ICs) comprising two sets of corresponding scrambler and descrambler circuits that are configured in a training mode, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on." If the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, scrambler and descrambler circuits are often employed in IC transmitters and receivers for use in high frequency communication between systems (e.g., between two compute systems via a network). Using a pseudorandom bit sequence to scramble a signal carrying repeating data may reduce narrow band interference that might otherwise be generated by the repeating data. The scrambler circuit performs a first operation on received data (i.e., original data) to scramble the data and the descrambler circuit receives the scrambled data and extracts the original data by performing an opposite action on the scrambled data.

Each scrambler circuit and each descrambler circuit may include a linear feedback shift register (LFSR) that has a plurality of memory elements (e.g., a plurality of flip flop registers). An LFSR comprises a shift register whose input bit is a linear function of its previous output state. LFSRs may utilize various combinatorial logic elements (e.g., exclusive-or gates (XOR), multiplexors, etc.) to implement their linear functions. The plurality of memory elements of an LFSR store bits of a sequence, where each of the memory elements stores one bit of the sequence at a time. Each memory element shifts its stored bit "out" and inputs the next bit of the sequence in response to a clock signal, such that a sequence of bits shifts through each memory element one bit at a time. The initial value stored in an LFSR (or the initial state) is called a seed, and the LFSR stores a finite number of possible states in succession as the bit sequence shifts through the LFSR over time. Eventually the finite series of states repeats in the LFSR. However, depending on the design, an LFSR can have a long cycle and generate a long sequence of bits that effectively appear random (i.e., the LFSR can function as a pseudorandom number generator). The pseudorandom output of an LFSR may be used to scramble input data (i.e., original data or packet data) for transmission to another system, and at a corresponding receiver circuit of the other system, pseudorandom output a similar LFSR may be used to descramble the scrambled data to extract the original data.

In general, scrambler and descrambler circuits may each function in a training mode and in a scrambling or descrambling mode respectively. For example, the pseudorandom bits shifted through and output from a scrambler circuit's LFSR may be used as training data to train an LFSR configured in an open loop in the descrambler circuit. The descrambler circuit receives the pseudorandom bits from the scrambler LFSR and shifts the bits through the descrambler LFSR in the open loop configuration. The descrambler may be trained relative to the scrambler circuit, or in other words, the scrambler and descrambler circuits may be "locked" or "synchronized," once the bit sequence (or pattern of bits) stored in the scrambler LFSR and the bit sequence stored in the descrambler LFSR at a given time are the same or off by a known number of memory elements. For example, the same sequence or pattern of bits may shift through each of the scrambler LFSR and the descrambler LFSR however the bits sequence (or bit pattern) stored in the descrambler LFSR at any one time may lag by one clock cycle relative to the bit pattern stored in the scrambler LFSR. Once the descrambler LFSR is trained with respect to the scrambler LFSR, the LFSR in the scrambler circuit may begin to perform scrambling operations. For example, the scrambler circuit may be configured to receive data intended for data transmissions (e.g., the original data or packet data received from an application) and may scramble the data based on a bitwise combination (e.g., XOR) with pseudorandom output bits from the scrambler LFSR. The scrambler circuit may transmit the scrambled data to the descrambler circuit via a communications channel (e.g., for communication to a second compute system via a network). Moreover, once the descrambler circuit is trained, it's descrambler LFSR may be reconfigured into a closed loop system in order to function as a pseudorandom number generator in the descrambler circuit. Then the descrambler circuit may receive the scrambled data, bitwise combine the scrambled data with the descrambler's LFSR pseudorandom output to descramble the data, and output the original data for processing.

As described above, an LFSR may comprise a plurality of memory elements and one or more combinatorial logic elements. The particular structure of an LFSR design may be based on one or more polynomials and may depend on which polynomial(s) are used for the design. Depending on the LFSR design, an LF SR may be "tapped," or in other words, it may output a bit sequence (e.g., pseudorandom bit sequence) at an output port of one or more of the LFSR memory elements, and that output bit sequence may pass through one or more combinatorial logic elements before reaching an output node of the LFSR (e.g., an output node of the scrambler or descrambler circuit) to generate an output signal. In one example, an LFSR with a plurality of memory elements may generate a pseudorandom number by tapping two memory elements and sequentially bitwise combining the output of the two memory elements. The combined output of the two memory elements of the LFSR may comprise the pseudorandom bit sequence, which may be sequentially bitwise combined with received data.

A scrambler circuit and a descrambler circuit that are coupled via a communication channel may each use the same general LFSR design to perform their respective functions, however, they may each tap their respective LFSRs in different places to generate and output bit sequence. This difference makes the descrambler circuit susceptible to a digital chip design issue referred to as a "timing violation," where delay within the circuit exceeds the time interval provided for clocking shifts within the LFSR or to the output. Timing violations may occur due to combinatorial logic that introduces delay within a circuit and may cause a circuit to malfunction at high frequency shift clock signals. Therefore, it is desirable to reduce the number of combinatorial elements in the LFSR data path before the pseudorandom bit sequence that is output from the LFSR is combined with received scrambled data to generate the descrambled data output from the descrambler circuit.

Resolving timing violation problems in scrambler and descrambler circuits may be both complex and time consuming. Solutions for these problems are more difficult to design when the memory elements that make up an LFSR implement multiple LFSR variations (e.g., implement multiple polynomials), and the solutions are even more difficult to design when the LFSR is used to scramble or descramble parallel data lines. When the same memory elements are used to implement multiple polynomials in an LFSR, the logic that's responsible for each polynomial may not be used, but it may still be a part of the circuit. The data may pass through that logic in a serial manner.

Methods and systems disclosed herein provide an efficient solution to timing violation problems in scrambler and descrambler circuits to allow higher frequency communication in electronic systems. Once an LFSR in a descrambler circuit (receiver side) is synchronized with an LFSR in a corresponding scrambler circuit (transmitter side), a control system in the descrambler circuit (or coupled to the descrambler circuit) may cause a change in position in the LFSR of where the LFSR is tapped to generate the pseudorandom sequence. For example, in a first port of a descrambler LFSR, two memory elements may be tapped and their output may be sequentially bitwise combined to generate the pseudorandom bit sequence output from the descrambler LFSR. The bit sequence tapped from the first port may be used in the training of the descrambler LFSR. Once the descrambler circuit is trained, the position of tapping the LFSR may be changed to a second port such that the propagation delay from the output of memory element(s) of the descrambler LFSR second port to an output node of the descrambler circuit is reduced relative to the propagation delay from the first port to the output node of the descrambler circuit. This second port may be implemented by tapping an output port of a memory element in the LFSR that comprises the fed-back pseudorandom bit sequence. The bit sequence tapped from the second port may be sequentially bitwise combined (e.g., XORed) with incoming scrambled data bits to generate a descrambled output signal (i.e., descrambled output data). The tap position change to the second port may allow the circuit to bypass combinatorial logic that would otherwise cause delay in the data path from the LFSR to the descrambler output, while still providing a pseudorandom bit sequence from the LFSR. For example, the descrambler circuit LFSR second port may be a tap taken directly from a single memory element (e.g., flip flop) of the LFSR for input to the descrambling XOR gate. By bypassing the combinatorial elements, delay may be reduced in the descrambler circuit and timing violations may be mitigated, thus scrambling and descrambling operations may function more quickly and higher rate communications may be enabled between ICs (and/or between computing devices). Causing the tap to change or be displaced (e.g., from one port of an LFSR to a second port of the LFSR) may be referred to as a lock-shift operation. Although the first port is referred to as a port of the LFSR, the first port may comprise output from more than one memory element of the LFSR (e.g., see first port 124 of FIG. 1).

Accordingly, before the descrambler circuit LFSR begins to perform descrambling operations, it first locks on an incoming signal from the scrambler circuit LFSR (i.e., synchronizes with the scrambler circuit LFSR during a training mode). After this initial synchronization, a "lock-shift" operation is performed where the receiver LFSR is configured in a closed loop and the LFSR memory elements are tapped from a second port in a different position of the LFSR than the first port (e.g., a time shift to the LFSR output), and may generate a pseudorandom bit sequence used for performing descrambler operations during a fast descrambling mode. The second port is positioned such that it is less prone to create a timing violation in the LFSR. The lock-shift operation takes effectively the same data (a pseudorandom bit sequence) from another point in the descrambler circuit LFSR (effectively a time shift) to reduce delay in the descrambler circuit (e.g., a propagation delay from the second port to the descrambler output is shorter that a delay from the first port to a descrambler output). The change in tap position (or port) in the descrambler LFSR will allow for producing correct descrambled data if the same lock-shift that is performed in the descrambler circuit LFSR is also performed in scrambler circuit LFSR. In other words, a time shift in LFSR output caused by the change or displacement in output port should be the same in both of the transmitter LFSR and receiver LFSR circuits to maintain sync. For example, if the second tap position of the descrambler circuit is offset, or displaced, by one memory element in the descrambler LFSR, then second tap position of the scrambler circuit should also be offset, or displaced, by one memory element. In this manner, the same time shift occurs in the transmitter and receiver LFSRs as a result of the lock-shift operations in the two LFSRs. In order to make this same distance lock-shift, a mode manager coupled to the descrambler circuit may inform the corresponding scrambler circuit that the descrambler circuit has executed the lock-shift operation, then the scrambler LFSR may also execute the lock-shift operation so that both LFSRs to switch to using their respective second tap positions. After the lock-shift operation, data communication from transmitter compute device to receiver compute device continues normally with the descrambler "lighter on logic" and timing violation mitigations in place in the digital data path of the descrambler circuit. Higher communication frequencies can be used in the data path due to the lock-shift operation, meaning more data passes on the same line over the same time interval.

The scrambler-descrambler synchronization process itself may be referred to as a "self-synchronizing LFSR." The descrambler may lock on (i.e., synchronize with) incoming data by itself without manual control or configuration. In these types of self-synchronizing LFSRs, the transmitting side and the receiving side may not be configured to communicate out-of-band information, such that making the fix to the LFSRs (i.e., performing the lock-shift) would not readily be made, because both sides should perform the lock-shift function with the descrambler being the initiator.

In some aspects of the present disclosure, an input-output line of communication for communicating the lock-shift signal (i.e., an indication to tap the second port in an LFSR) may be implemented to notify a scrambler circuit that a lock-shift operation should be performed to maintain synchronization during fast scrambling and descrambling operations. In some embodiments, the lock-shift signal may comprise a slow signal that changes, for example, from logical zero to logical one to indicate to the scrambler circuit LFSR to perform the lock-shift operation and tap the second port of the scrambler circuit LFSR. For example, the logical zero and one values may be used to select an output of a multiplexor that transmits data received from the first or second tap, as described in more detail below. However, the disclosure is not limited to any specific signal content for notifying a scrambler circuit to perform a lock-shift operation. In some embodiments, the lock-shift communication may not occur on an actual input-output line between a descrambler and scrambler circuit, but may instead be implemented based on detecting synchronization events that occur in the data paths of two sets of scrambler-descrambler circuit pairs. This method may eliminate the need for configuring a separate input-output line between ICs for the purpose of communicating a lock-shift signal. For example, some ICs are designed with both of a transmitter scrambler circuit and a receiver descrambler circuit in one IC, such that a transmitter scrambler circuit in a primary IC may be communicatively coupled to the receiver descrambler circuit in a secondary IC, and a transmitter scrambler circuit in the secondary IC may be communicatively coupled to the receiver descrambler circuit in the primary IC, to form a communication loop as follows:

First-IC Scrambler→Second-IC Descrambler→Second-IC Scrambler→First IC Descrambler The system may also be implemented with individual ICs for each of the scrambler and descrambler circuits in the two sets of scrambler-descrambler pairs that may be configured in the same communication loop pattern.

As described above, scrambler and descrambler circuits may be configured in various ways to perform lock-shift operations and reduce delay in their data paths. For instance, FIG. 1 is block diagram of a system 100 including pair of integrated circuits (ICs) comprising two sets of corresponding scrambler and descrambler circuits that are configured in a training mode, according to an example embodiment. As shown in FIG. 1, system 100 includes a primary IC 102, a secondary IC 104, a first scrambler circuit 110, a first descrambler circuit 120, a second scrambler circuit 130, and a second descrambler circuit 140. The first scrambler circuit 110 comprises a first transmitter LFSR 112 and a first transmitter LFSR first port 114. The first descrambler circuit 120 comprises a first receiver LFSR 122, a first receiver LFSR first port 124, a first receiver LFSR first output node 126, a first receiver LFSR first output signal 128, and an LFSR XOR gate 150. The second scrambler circuit 130 comprises a second transmitter LFSR 132 and a second transmitter LFSR first port 134. The second descrambler circuit 140 comprises a second receiver LFSR 142, a second receiver LFSR first port 144, a second receiver LFSR first output node 146, a second receiver LFSR first output signal 148, and an LFSR XOR gate 152. Also shown in FIG. 1 are a transmit (TX) exclusive-or (XOR) gate 154, a TX XOR gate 156, a lock-shift signal 160, loc-shift signal 164, transmit bit sequence 170, transmit bit sequence 172, first bit sequence 180, first transmitter 190, second transmitter 192, first receiver 194, and second receiver 196. Although system 100 includes two sets of scrambler-descrambler pairs, in systems that communicate in only one direction, there may be only one scrambler-descrambler pair. For example, the lock-shift operation may be implemented only in first scrambler circuit 110 and first descrambler circuit 120. In this regard, IC 102 may be configured with (or may utilize) only first scrambler circuit 110, and IC 104 may be configured with (or may utilize) only first descrambler circuit 120.

The dashed lines shown in FIG. 1 indicate communication paths where a data sequence does not travel during a training mode (e.g., prior to a lock-shift operation).

As shown in FIG. 1, first transmitter LFSR 112 of first scrambler circuit 110 is configured to provide training data to first receiver LFSR 122 in descrambler circuit 120. First receiver LFSR 122 will receive the training data (e.g., a pseudorandom sequence of bits), shift the training data through first receiver LFSR 122, and tap first receiver LFSR first port 124. As described above, although first receiver LFSR first port 124 is referred to as a port of the LFSR, first receiver LFSR first port 124 may comprise output from a plurality of memory elements of the LFSR. For example, first receiver LFSR first port 124 includes output from memory element 2 and memory element 4 of first receiver LFSR 122. (Similarly, second receiver LFSR first port 144 comprises output from memory element 2 and memory element 4 of second receiver LFSR 142.)

The bit sequences output from first receiver LFSR first port 124 may be sequentially bitwise combined (e.g., in LFSR XOR gate 150) to output a sequence of bits that is used to test whether scrambler circuit 110 and descrambler circuit 120 are synchronized. This summing of memory element outputs in LFSR XOR gate 150 introduces delay in the circuit. The output from LFSR XOR gate 150 may then be combined (e.g., XORed) with the received training data from first transmitter LFSR 112 to generate a first receiver LFSR first output signal 128 at first receiver LFSR first output node 126. The shifting of received training data through first receiver LFSR 122 will continue and eventually the received training data will match the output of LFSR XOR 150, which may cause the first receiver LFSR output signal 128 to comprise all zeros. This output signal indicates whether first receiver LFSR 122 is locked on the training data, or in other words, whether first transmitter LFSR 112 in first scrambler circuit 110 is synchronized with first receiver LFSR 122 in descrambler circuit 120.

More specifically, the training data comprises a sequence of pseudorandom bits that is shifted through a plurality of memory elements (e.g., memory elements 0, 1, 2, 3, and 4) of first transmitter LFSR 112. Lock-shift signal 160 comprises a bit value (e.g., logical zero) that indicates (e.g., via a multiplexor) that first transmitter LFSR 112 is to be tapped at first transmitter LFSR first port 114. The tapped sequence of pseudorandom bits may be sequentially bitwise combined with (e.g., XORed with) a transmit bit sequence 170 (e.g., a sequence of zeros) such that the combined output comprises a sequence of pseudorandom bits, which is transmitted to first receiver LFSR 122 in descrambler circuit 120.

Also, first receiver LFSR 122 of first descrambler circuit 120 is configured to receive the training bits from first transmitter LFSR 112. Lock-shift signal 162 comprises a bit value (e.g., logical zero) that indicates (e.g., via a multiplexor) that first receiver LFSR 122 is configured to receive the sequence of pseudorandom bits from first transmitter LFSR 112 and shift the received sequence of bits though a plurality of memory elements (e.g., memory elements 0, 1, 2, 3, and 4 in first receiver LFSR 122), where first receiver LFSR 122 is to be tapped at first receiver LFSR first port 124 (e.g., at the output of memory elements 2 and 4). Bit streams output from first receiver LFSR first port 124 may be sequentially bitwise combined (e.g., in LFSR XOR gate 150) to output a single stream of bits that are then sequentially bitwise combined (e.g., XORed) with the training data received from first scrambler circuit 110, to generate the first receiver LFSR first output signal 128 at first receiver LFSR first output node 126. The first output signal 128 indicates whether or not the first receiver LFSR 122 and first transmitter LFSR 112 are synchronized (i.e., locked). The first receiver LFSR output signal 128 may also be referred to as an error signal, a sync signal, a sync-error signal, or a lock-error signal. In this regard, when first output signal 128 indicates that the received training data matches the output of XOR gate 150, then there is no sync-error. First receiver LFSR first output signal 128 may comprise the value zero to indicate a detected match (e.g., no sync-error). After a configurable amount of time (or a configurable number of bits) with no sync-errors (e.g., outputting consecutive zeros), first receiver LFSR 122 is considered to be locked (i.e., synchronized) with first transmitter LFSR 112. Once locked, a mode manager (see FIG. 9) is configured to cause first receiver LFSR 122 to be reconfigured for a fast descrambling mode such that the open loop of the first receiver LFSR 122 is closed to shift through the pseudorandom bit sequence and output the sequence for performing a descrambling function on received data. Moreover, a second port in a different position of the LFSR (see first receiver LFSR second port 224 in FIG. 2) may be tapped such that LFSR XOR gate 150 may be by-passed to reduce time delay in the circuit for performing the descrambling function. Changing the tap position in an LFSR may be referred to as a lock-shift operation.

Second scrambler circuit 130 is substantially the same or similar to first scrambler circuit 110 and second descrambler circuit 140 is substantially the same or similar to first descrambler circuit 120. Accordingly, second transmitter LFSR 132 and second receiver LFSR 142 operate in a similar or same manner as first transmitter LFSR 112 and first receiver LFSR 122 respectively. For example, during a training mode, second receiver LFSR 142 receives training data from second transmitter LFSR 132 (e.g., based on a bit sequence tapped from second transmitter LFSR first port 134 combined with transmit bit sequence 272), and shifts the received training data through second receiver LFSR 132 such that eventually the received training data will match a bit sequence output from LFSR XOR gate 152 that combines the two bit sequences tapped from second receiver LFSR first port 144 (e.g., output from memory elements 2 and 4). The matching bits may be indicated in the second receiver LFSR first output signal 148 (e.g., first output signal 148 may to comprise all zeros). This output signal indicates whether second receiver LFSR 142 is locked on the incoming training data, or in other words, whether second transmitter LFSR 132 in second scrambler circuit 130 is synchronized with second receiver LFSR 142 in second descrambler circuit 140. Moreover, lock-shift signal 164 comprises a bit value that indicates (e.g., via a multiplexor) whether second transmitter LFSR 132 is to be tapped at second transmitter LFSR first port 134 (e.g., the output of memory element 0) or second transmitter LFSR second port 234 (e.g., the output of memory element 1).

In second descrambler circuit 140, lock-shift signal 166 indicates (e.g., via a multiplexor) whether second receiver LFSR 142 is configured in an open loop to receive training data from second transmitter LFSR 132 (e.g., where training bits are shifted though memory elements 0, 1, 2, 3, and 4 of second receiver LFSR 132) or in a closed loop configuration for operating in a fast descrambling mode, where second receiver LFSR 132 generates a pseudorandom bit sequence. In this regard, lock-shift signal 166 may also indicate which of second receiver LFSR first port 142 and second receiver LFSR second port 244 (see FIG. 2) is to be tapped for generating a second receiver LFSR 142 output signal.

Figure 2:
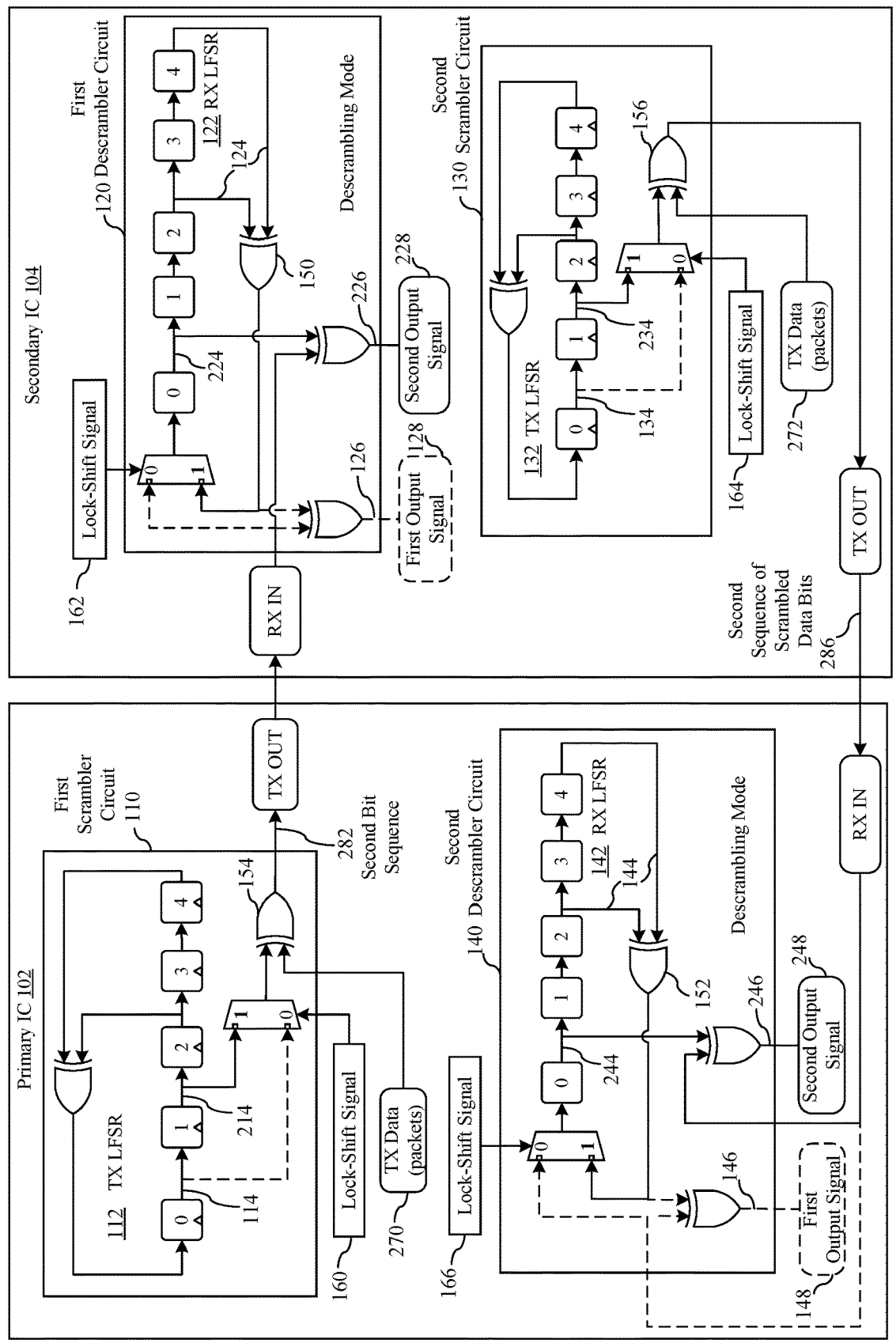
FIG. 2 is block diagram of a system comprising the same ICs shown in FIG. 1 and showing circuit reconfigurations implemented in the LFSRs due to lock-shift operations, according to an example embodiment.

As described above, a second port in first receiver LFSR 122 may be tapped for performing a fast descrambling function in order to reduce time delay in the circuit. For instance, FIG. 2 is block diagram of a system 200 comprising the same ICs shown in FIG. 1 and showing circuit reconfigurations implemented in the LFSRs due to lock-shift operations, according to an example embodiment. As shown in FIG. 2, system 200 includes primary IC 102, secondary IC 104, first scrambler circuit 110, first descrambler circuit 120, second scrambler circuit 130, and second descrambler circuit 140. First scrambler circuit 110 comprises first transmitter LFSR 112, first transmitter LFSR first port 114, and a first transmitter LFSR second port 214. First descrambler circuit 120 comprises first receiver LFSR 122, first receiver LFSR first port 124, a first receiver LFSR second port 224, first receiver LFSR first output node 126, a first receiver LFSR second output node 226, first receiver LFSR first output signal 128, a first receiver LFSR second output signal 228, and LFSR XOR gate 150. Second scrambler circuit 130 comprises second transmitter LFSR 132, second transmitter LFSR first port 134, and second transmitter LFSR second port 234. Second descrambler circuit 140 comprises second receiver LFSR 142, second receiver LFSR first port 144, a second receiver LFSR second port 244, second receiver LFSR first output node 146, a second receiver LFSR second output node 246, second receiver LFSR first output signal 148, a second receiver LFSR second output signal 248, and LFSR XOR gate 152. Also shown in FIG. 2 are TX XOR gate 154, TX XOR gate 156, lock-shift signal 160, lock-shift signal 162, lock-shift signal 164, lock-shift signal 166, transmit data 270, transmit data 272, a second bit sequence 282, and a second sequence of data bits 286.

The dashed lines shown in FIG. 2 indicate communication paths where a data sequence does not travel after a lock-shift operation occurs for the purpose of fast descrambling operations.

Second bit sequence 282 may also be referred to as a first sequence of scrambled data bits.

Transmit (TX) data 270 may be referred to as a first data bit sequence 270 or input 270. Transmit data 272 may be referred to as a second data bit sequence 272 or input 272. Transmit data 270 and transmit data 272 may comprise data (e.g., original or "unscrambled" data) received by first scrambler circuit 110 and second scrambler circuit 130 respectively for transmission to a corresponding receiver circuit such as first descrambler circuit 120 and second descrambler circuit 140 respectively. For example, primary IC 102 and secondary IC 104 may be implemented in the same or different host computing machines and coupled via a communication channel (e.g., vi a network). Transmit data 270 may comprise data received from an application or other software instantiated within (or communicatively coupled to) primary IC 102, to be transmitted to an application or other software instantiated within (or communicatively coupled to) secondary IC 102. Similarly, transmit data 272 may comprise data received from an application or other software instantiated within (or communicatively coupled to) secondary IC 104 to be transmitted to an application or other software instantiated within (or communicatively coupled to) primary IC 102. Transmit data 270 and transmit data 272 may each comprise information bearing data and each be referred to as original data. Transmit data 270 and transmit data 272 may each be received in a scrambler circuit, to be scrambled before transmission to a corresponding receiver comprising a descrambling function to output the original information bearing data.

As described above with respect to FIG. 1, during the training mode, a sequence of pseudorandom bits may be tapped from first transmitter LFSR first port 114 and this output may be sequentially bitwise combined (e.g., XORed) with a transmit bit sequence 170 (e.g., a sequence of all zeros) to generate training data sent to first receiver LFSR 122. First receiver LFSR 122 shifts the training data through memory elements (e.g., memory elements 0, 1, 2, 3, and 4). Bits output from memory element 2 and memory element 4 are combined in a combinatorial logic element (e.g., LFSR XOR gate 150) and the output of the combinatorial logic element is combined (e.g., XORed) with the received training data to generate first receiver LFSR first output signal 128 at first receiver LFSR first output node 126. First receiver LFSR first output signal 128 indicates whether or not the first receiver LFSR 122 and first transmitter LFSR 112 are synchronized. After a configurable time where first receiver LFSR 122 is considered to be is locked (or synchronized with first transmitter LFSR 112), a mode manager (see FIG. 9) may be configured to cause first receiver LFSR 122 to be reconfigured (i.e., perform a lock-shift operation) for executing a fast descrambling function. For example, referring to FIG. 2, first receiver LFSR 122 may comprise a multiplexor that enables the reconfiguration from open loop to closed loop operation based on lock-shift signal 162. However, the disclosure is not limited with regard to any specific way to execute the lock-shift operation, and any suitable method may be utilized. During reconfiguration, the open loop of the first receiver LFSR may be closed such that first receiver LFSR 122 functions as an LFSR pseudorandom number generator with its output reconfigured to be tapped at first receiver LFSR second port 224. At first receiver LFSR second output node 228, first receiver LFSR second output signal 228 is configured as a sequential bitwise combination of a received bit sequence from first transmit LFSR 112 and the bit sequence tapped from first receiver LFSR second port 224 such that a signal propagation time from first receiver LFSR second port 224 to first receiver LFSR second output node 226 is less than the signal propagation time from first receiver LFSR first port 124 to first receiver LFSR first output node 126. This reduced delay from first receiver LFSR memory elements to first receiver LFSR second output node 226 is due to fewer combinatorial logic elements connected between the tapped LFSR memory elements and the output node 226 after the lock-shift operation. For example, as shown in FIGS. 1 and 2, before the lock-shift operation, the data tapped from memory elements 2 and 4 of first receiver LFSR 122 passes through two XOR gates (including LFSR XOR gate 150) to reach first receiver LFSR first output node 126, and after the lock-shift operation, the data tapped from memory element 0 only passes through one XOR gate to reach the first receiver LFSR second output node 226 (e.g., bypassing LFSR XOR gate 150). Of note, in instances where the LFSRs comprise parallel circuits, the delay caused by combinatorial elements increases because the polynomial variance may indicate that many more combinatorial logic elements are to be placed in the data path. In some embodiments, first descrambler circuit 120 may be configured such that first output node 126 and second output node 226 of first receiver LFSR 122 may comprise the same physical node. Similarly, second descrambler circuit 140 may be configured such that first output node 146 and second output node 246 of second receiver LFSR 142 may comprise the same physical node.

In the receiver LFSRs shown in FIGS. 1 and 2, after the lock-shift operation, the data path to the output node may be shortened such that the incoming data from the corresponding scrambling circuits may be combined (e.g., XORed) with the output of memory element 0. As described before, this change means that a time shift occurs in the entire data sequence shifting through the receiver LFSRs such that the same time shift should be applied to the transmitter LFSRs for accurate scrambling and descrambling functionality. In some embodiments, the lock-shift signal 162 on the RX LFSR of secondary IC 104 may rise first to implement a lock-shift operation, and the corresponding lock-shift signal 160 of the TX LFSR on primary IC 102 may rise afterwards to implement a lock-shift function in the TX LFSR. As such, actions in first descrambler circuit 120 inform first scrambler circuit 110 that the training mode is complete. Similarly, actions in second descrambler circuit 140 inform second scrambler circuit when the training mode is complete.

Figure 3:
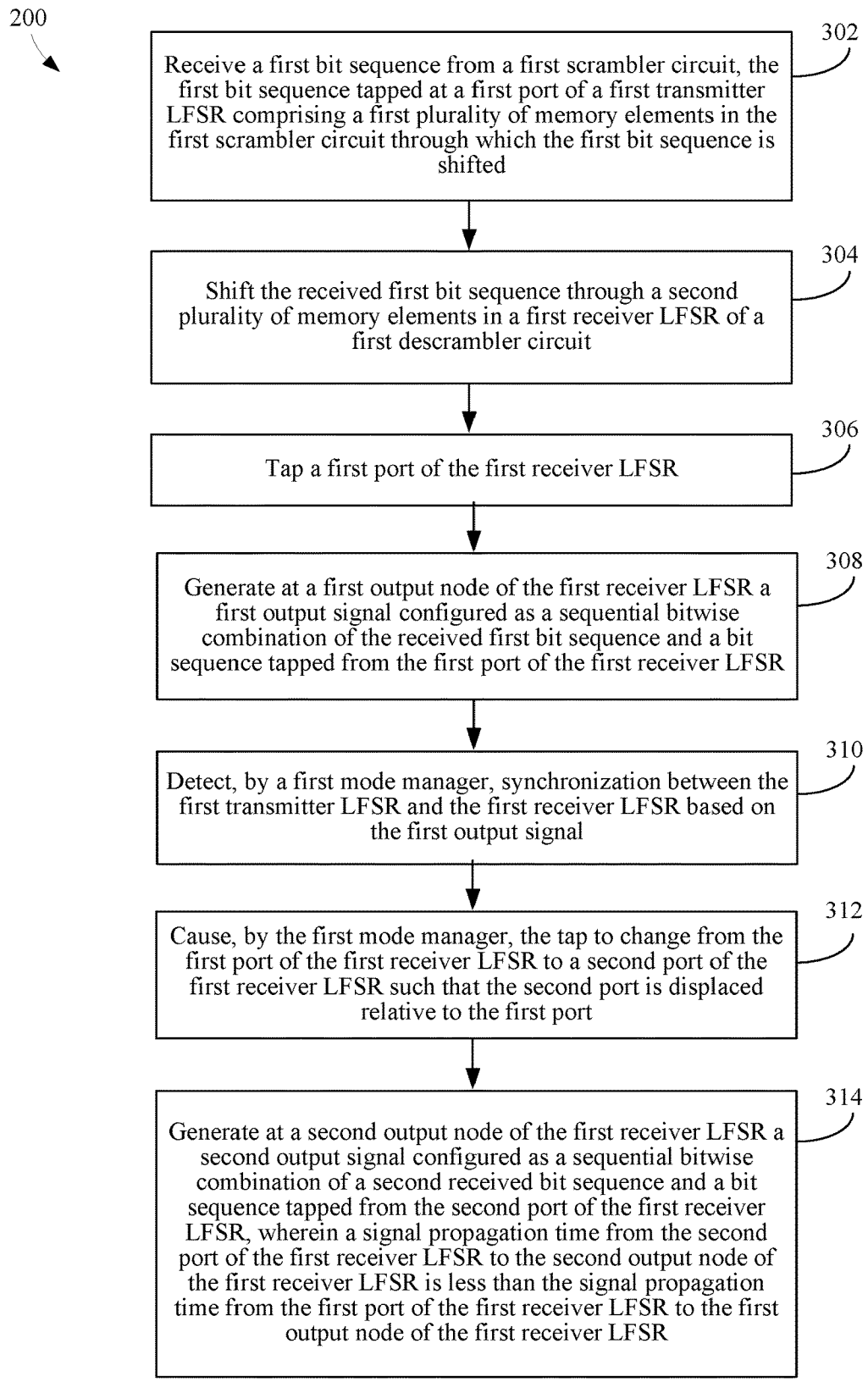
FIG. 3 is a flowchart of a method for reducing time delay in a descrambler circuit by changing a tap position in a receiver LFSR once the receiver LFSR is synchronized with a corresponding transmitter LFSR, according to an example embodiment.

A descrambler circuit may reduce time delay through its LFSR in various ways. For instance, FIG. 3 is a flowchart 300 of a method for reducing time delay in a descrambler circuit by changing a tap position in a receiver LFSR once the receiver LFSR is synchronized with a corresponding transmitter LFSR, according to an example embodiment. Flowchart 300 may be implemented in serial or parallel systems such as systems 100, 200, 400, 500, 600A, 600B, 700A, 700B, 900A, 900B, 1000A, and 1000B. For purposes of illustration, flowchart 300 is described with reference to FIGS. 1 and 2. Other structural and operational embodiments will be apparent to persons skilled in the relevant art(s) based on the following discussion regarding flowchart 300.

Flowchart 300 begins with step 302. In step 302, a first bit sequence is received from a first scrambler circuit, the first bit sequence is tapped at a first port of a first transmitter LFSR comprising a first plurality of memory elements in the first scrambler circuit through which the first bit sequence is shifted. For example, first receiver LFSR 122 in first descrambler circuit 120 is configured to receive first bit sequence 180 from first transmit LFSR 112 in first scrambler circuit 110. First bit sequence 180 may be shifted through a first plurality of memory elements (e.g., memory elements 0, 1, 2, 3, and 4) of first transmitter LFSR 112 that may be tapped at first transmitter LFSR first port 114 (e.g., from the output of memory element 0 of first transmitter LFSR 112) and combined in XOR gate 154 with transmit bit sequence 170 that may comprise a sequence of zero value bits, then output for transmission to first descrambler circuit 120. The first bit sequence 180 may comprise a pseudorandom bit sequence output by first scrambler circuit 110.

In step 304, the received first bit sequence may be shifted through a second plurality of memory elements in a first receiver LFSR of a first descrambler circuit. For example, first receiver LFSR 122 may comprise a second plurality of memory elements (e.g., memory elements 0, 1, 2, 3, and 4 of first receiver LFSR 122). First receiver LFSR 122 may be configured to shift the received first bit sequence 180 through memory elements 0, 1, 2, 3, and 4.

In step 306, a first port of the first receiver LFSR is tapped. For example, first receiver LFSR 122 may be configured to tap first receiver LFSR first port 124. In the example shown in FIG. 1, first receiver LFSR first port 124 may include the output ports of memory elements 2 and 4 of receiver LFSR 122.

In step 308, at a first output node of the first receiver LFSR a first output signal is generated where the first output signal is configured as a sequential bitwise combination of the received first bit sequence and a bit sequence comprising a sequential bitwise combination of bit sequences tapped from the first port of the first receiver LFSR. For example, first receiver LFSR 122 may be configured to generate at first output node 126 the first receiver LFSR first output signal 128 by sequentially bitwise combining (e.g., XOR-ing) the received first bit sequence 180 from first scrambler circuit 110 and a bit sequence output from LFSR XOR gate 150 comprising a sequentially bitwise combination of bit sequences tapped from first LFSR first port 124 (e.g., bit sequences output from memory elements 2 and 4) of the first receiver LFSR 122.

In step 310, a first mode manager detects synchronization between the first transmitter LFSR and the first receiver LFSR based on the first output signal. For example, a first mode manager of secondary IC 104 (e.g., see first mode manager 910 of secondary IC 904 shown in FIG. 9) is configured to detect synchronization between first transmitter LFSR 112 and first receiver LFSR 122 based on first receiver LFSR first output signal 128. First receiver LFSR first output signal 128 may indicate that the synchronization has occurred where the received first bit sequence 180 and the bit sequence output from LFSR XOR gate 150 match during the training mode.

In step 312, the first mode manager causes the tap to change from the first port of the first receiver LFSR to a second port of the first receiver LFSR such that the second port is displaced relative to the first port. For example, the first mode manager (e.g., see first mode manager 910 of secondary IC 904 shown in FIG. 9) may comprise a control state machine for controlling changes in the LFSR circuits, a sync-error counter for detecting when LFSRs are synchronized (i.e., locked), and/or lock decision logic for determining whether or when to perform a lock-shift operation. For example, the first mode manager may be configured to cause the LFSR tap in the first receiver LFSR to change or be displaced from first LFSR first port 124 to first receiver LFSR second port 224. In the example shown in FIG. 2, first receiver LFSR second port 224 is positioned at the output of memory element 0, which is displaced by one clock signal (or one memory element) from first receiver LFSR first port 124 taken at the outputs of memory elements 2 and 4 of first receiver LFSR 122. In other words, in first receiver LFSR 122, it takes one clock signal for the outputs of memory elements 2 and 4 (that are combined in LFSR XOR gate 150) to shift to the output of memory element 0 (e.g., a time shift of one clock cycle). The output of memory element 0 of first receiver LFSR 122 produces the same bit values as the combined outputs of memory elements 2 and 4 from LFSR XOR gate 150, however, at one clock signal later. Changing the tap from the first port of the first receiver LFSR to a second port of the first receiver LFSR provides the benefit of reducing time delay in descrambling circuit 120 as described in step 314.

In step 314, at a second output node of the first receiver LFSR a second output signal is generated where the second output signal is configured as a sequential bitwise combination of a received second bit sequence and a bit sequence tapped from the second port of the first receiver LFSR, wherein a signal propagation time from the second port of the first receiver LFSR to the second output node of the first receiver LFSR is less than the signal propagation time from the first port of the first receiver LFSR to the first output node of the first receiver LFSR. For example, first receiver LFSR second output signal 228 is generated at first receiver LFSR second output node 226. First receiver LFSR second output signal 228 may be configured as a sequential bitwise combination of a bit sequence (e.g., received second bit sequence 282 from first scrambler circuit 110 comprising scrambled data) and a bit sequence tapped from first receiver LFSR second port 224 (e.g., a pseudorandom bit sequence) such that a signal propagation time from first receiver LFSR second port 224 (e.g., tapped from memory element 0) to first receiver LFSR second output node 226 is less than the signal propagation time from first receiver LFSR first port 124 (e.g., tapped from memory elements 2 and 4) to first receiver LFSR first output node 126. The slower signal propagation time from first receiver LFSR first port 124 to first receiver LFSR first output node 126 is caused by LFSR XOR gate 150, which is positioned between the first port 124 and the first output node 126. In the example shown in FIGS. 1 and 2, the slower signal propagation time or delay is caused by one XOR gate in the data path. However, in more complex LFSRs, such as LFSRs based on multiple polynomials and/or parallel LFSRs, the LFSR circuits may comprise many more combinatorial elements that may each increase delay from the memory elements of the LFSR to a first output node of the descrambler circuit. Therefore, by changing the tap position to the second port, time delay in the descrambler circuit is reduced and scrambler circuit 110 and descrambler circuit 120 are able to support faster communication between ICs.

Figure 4:
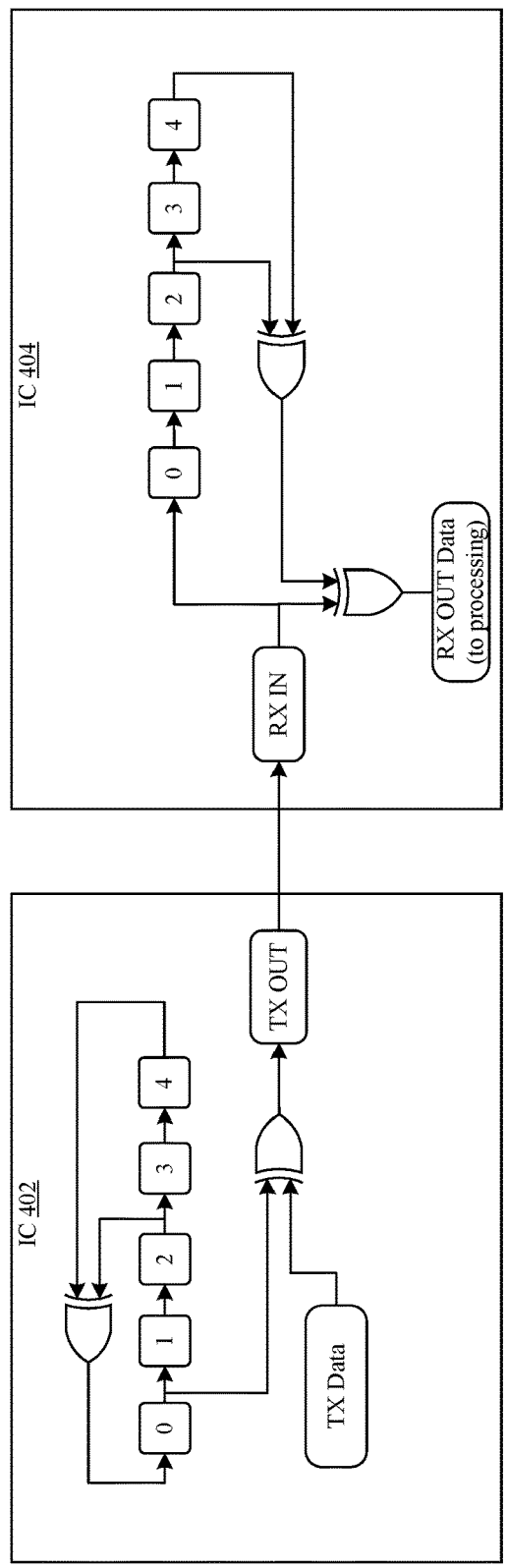
FIGS. 4 and 5 comprise block diagrams of serial scrambler and descrambler circuits implemented with one or two polynomials used to design the LFSR circuits, according to an example embodiment.
Figure 5:
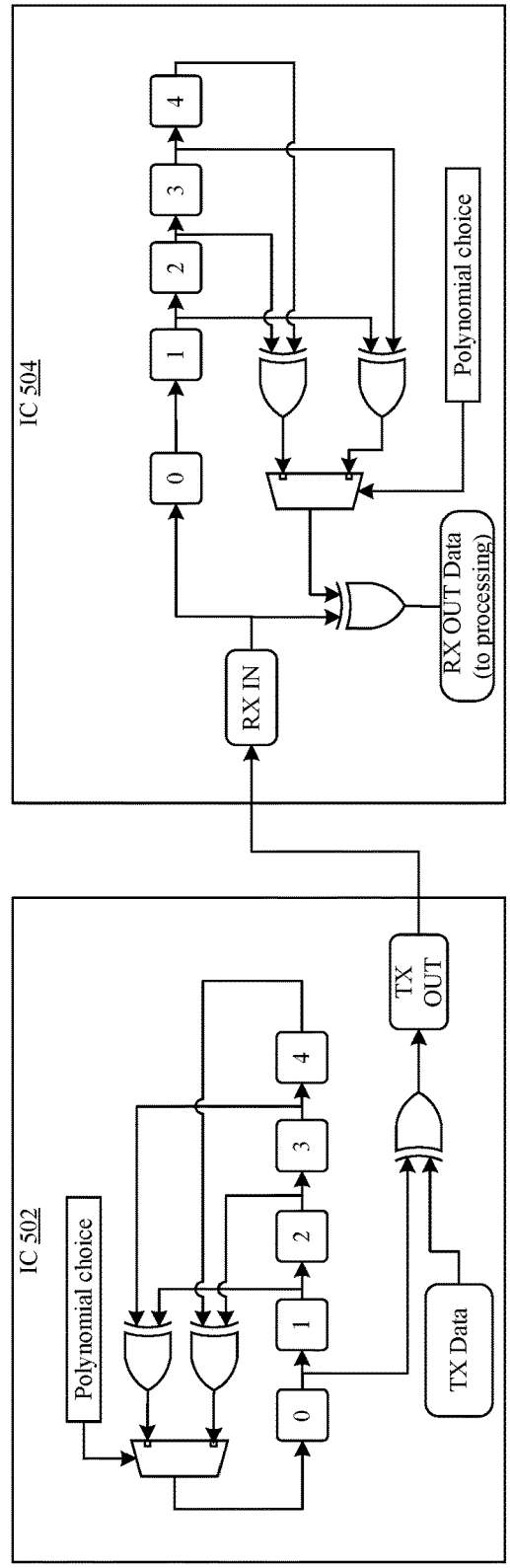

As described above, a structure of an LFSR circuit may be designed based on one or more polynomials. FIGS. 4 and 5 comprise block diagrams of a system 400 and a system 500 comprising serial scrambler and descrambler circuits implemented with one or two polynomials used to design the LFSR circuits, according to an example embodiment. As shown in FIG. 4, system 400 comprises a primary IC 402 and a secondary IC 404. As shown in FIG. 5, system 500 comprises primary IC 502 and secondary IC 504.

Referring to FIG. 4, system 400 includes primary IC 402 and secondary IC 404. IC 402 comprises a serial transmitter LFSR in an scrambler circuit that is similar or substantially the same as first transmitter LFSR 112 in first scrambler circuit 110. IC 404 comprises a serial descrambler circuit LFSR that is similar or substantially the same as first receiver LFSR 122 in descrambler circuit 120. For example, the structure of the LFSR in IC 402 includes memory elements 0, 1, 2, 3, and 4 where the outputs of memory elements 2 and 4 are sequentially bitwise combined and fed back to the input of memory element 0. The structure of the LFSR in IC 404 also includes memory elements 0, 1, 2, 3, and 4, where the outputs of memory elements 2 and 4 are sequentially bitwise combined and fed back to the input of memory element 0. The structures of these LFSRs, including the positions of the feedback taps, are determined based on a transition matrix that represents the polynomial:

$$X^5+X^3+1 \quad (1)$$

such that the feedback taps are positioned at the output of the third memory element (i.e., memory element 2) and the output of the fifth memory element (i.e., memory element 4) corresponding to exponents in the polynomial.

In contrast, referring to FIG. 5, system 500 includes an IC 502 and an IC 504. IC 502 comprises a serial transmitter LFSR in a scrambler circuit, and IC 504 comprises a corresponding serial receiver LFSR in a descrambler circuit. The structures of these LFSRs, including the positions of the feedback taps, are based on transition matrices representing two polynomials:

$$X^5+X^3+1 \quad (1)$$

$$X^4+X^2+1 \quad (2)$$

Based on these polynomials both transmitter and receiver LFSRs are given a structure where feedback taps are positioned after the output of the third memory element (i.e., memory element 2) and the output of the fifth memory element (i.e., memory element 4) based on polynomial (1), and after the output of the second memory element (i.e., memory element 1) and the output of the fourth memory element (i.e., memory element 3) based on polynomial (2). As can be seen in FIG. 5, a multiplexor has been included in each of the transmitter and receiver LFSRs to choose a feedback data path based on polynomial (1) or polynomial (2). This additional combinatorial element (the multiplexor) also adds data propagation delay from the tapped outputs of the LFSR memory elements to the output of the scrambler circuit in IC 502 and the output of the descrambler circuit in IC 504. The additional propagation delay increases the likelihood of timing violations (and thus causing lower communication rates), which may be mitigated or reduced by displacing or shifting the tapped memory element output of the descrambler circuit in IC 504 using a lock-shift operation.

In some embodiments, lock-shift operations may also be applied in LFSRs that support other or additional polynomial combinations. For instance, FIGS. 6A and 6B comprise block diagrams of a system 600A and 600B comprising multi-polynomial scrambler and descrambler LFSRs configured in a training mode, according to an example embodiment. FIGS. 7A and 7B comprise block diagrams of a system 700A and 700B comprising the multi-polynomial LFSRs of FIGS. 6A and 6B configured in a fast descrambling mode after a lock-shift operation has been executed, according to an example embodiment.

Figure 6A:
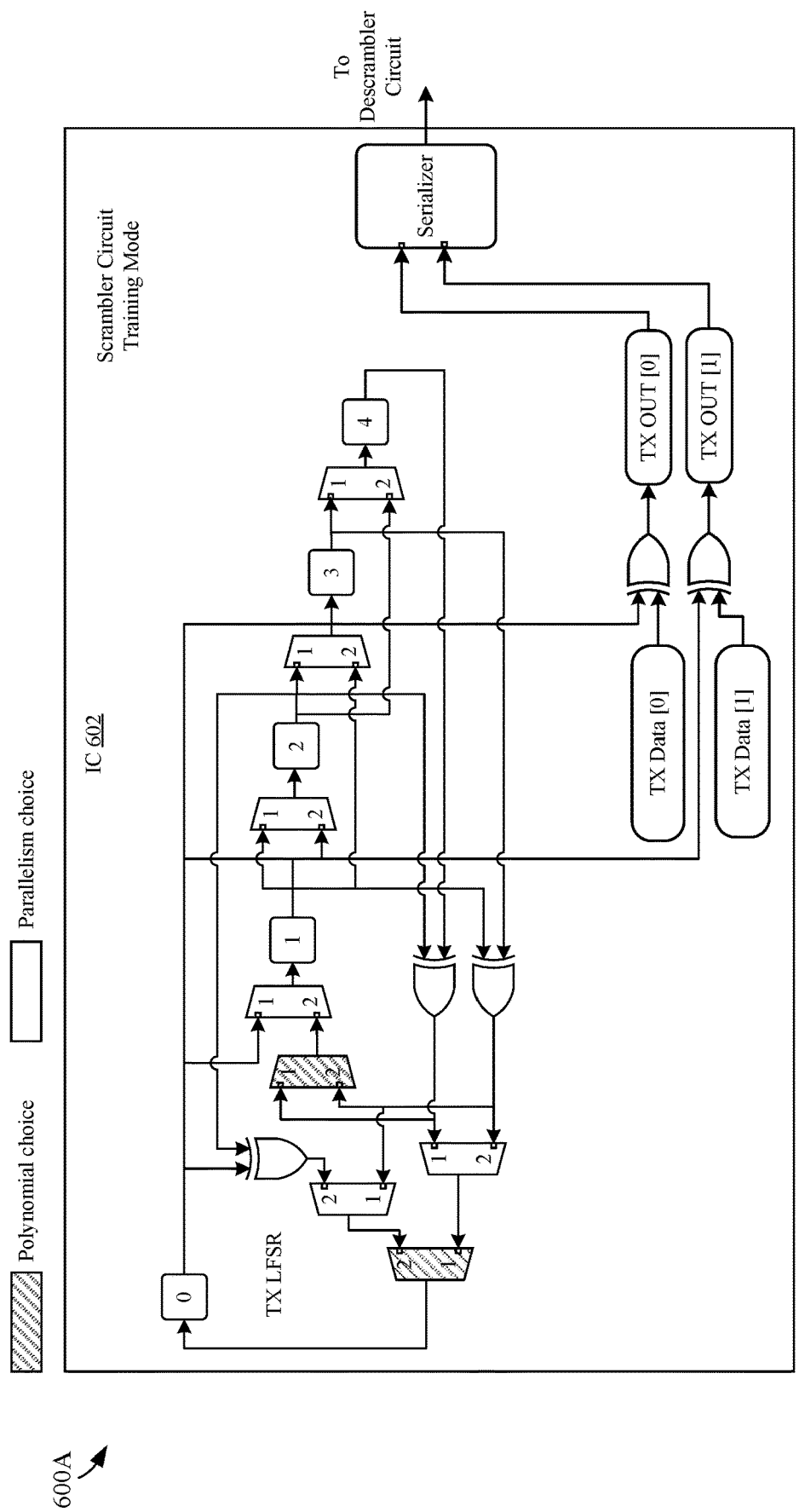
FIGS. 6A and 6B comprise block diagrams of a system comprising multi-polynomial scrambler and descrambler LFSRs configured in a training mode, according to an example embodiment.
Figure 6B:
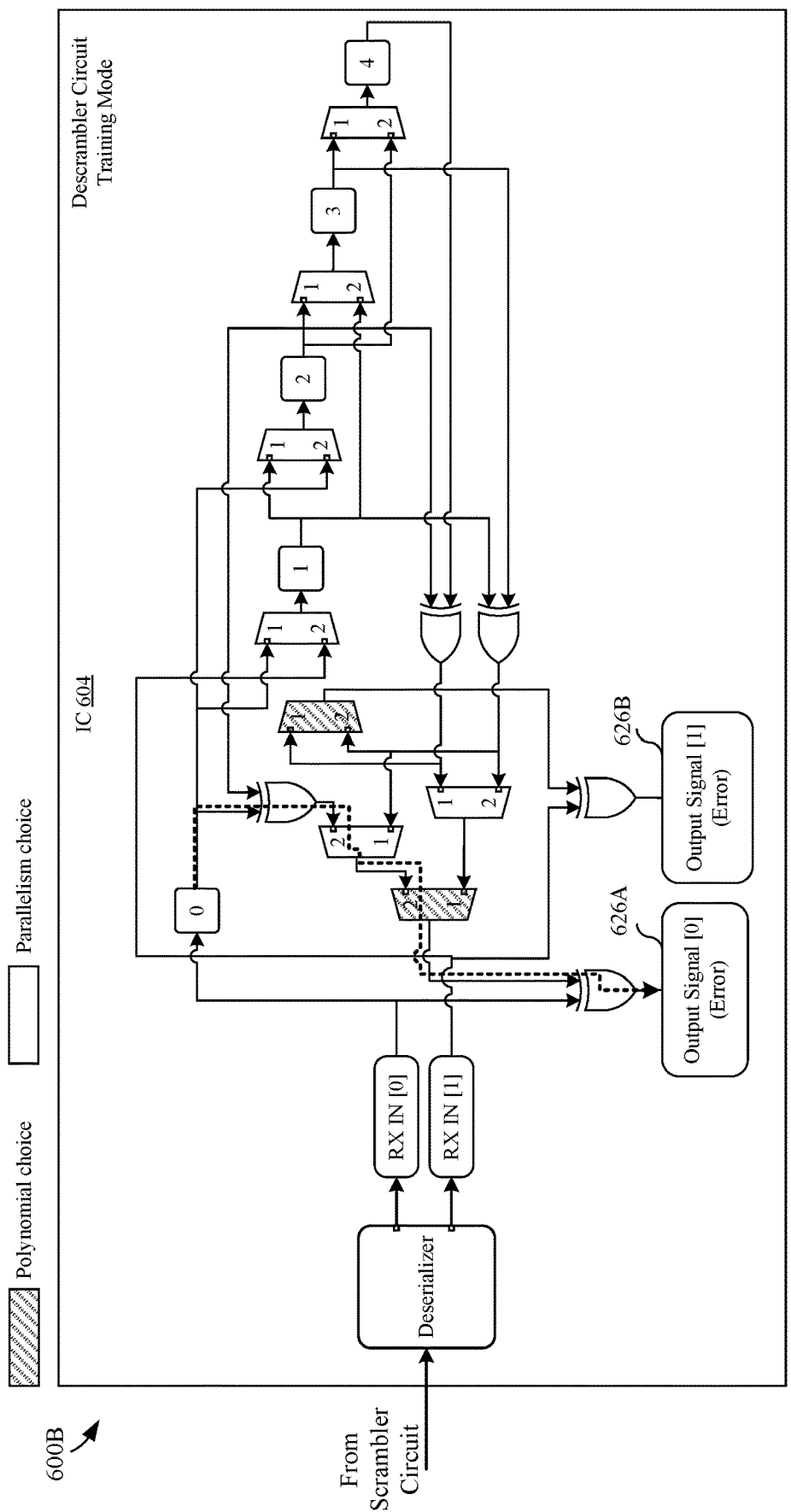
Figure 7A:
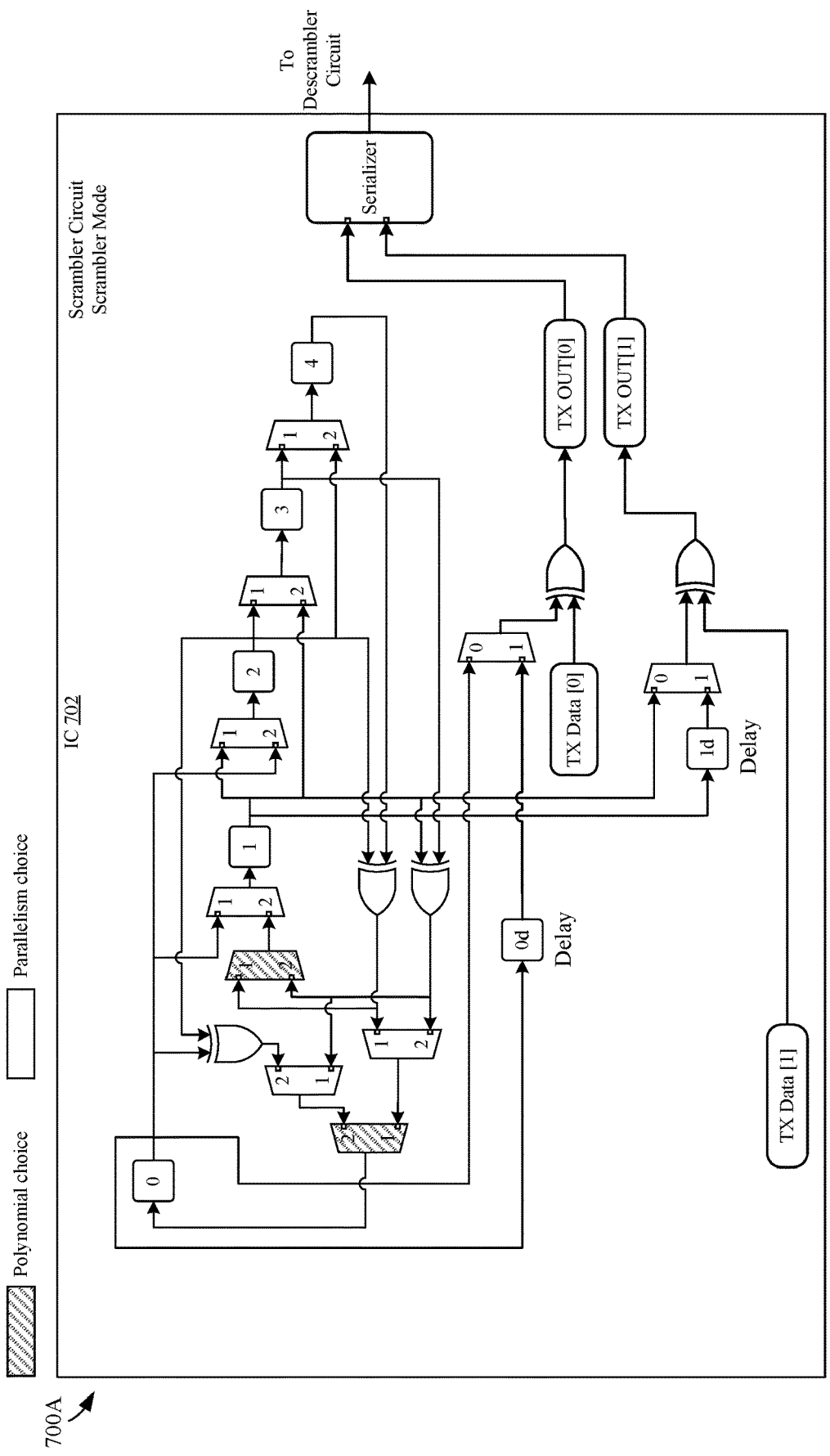
FIGS. 7A and 7B comprise block diagrams of a system comprising the multi-polynomial LFSRs of FIGS. 6A and 6B configured in a fast descrambling mode after a lock-shift operation has been executed, according to an example embodiment.
Figure 7B:
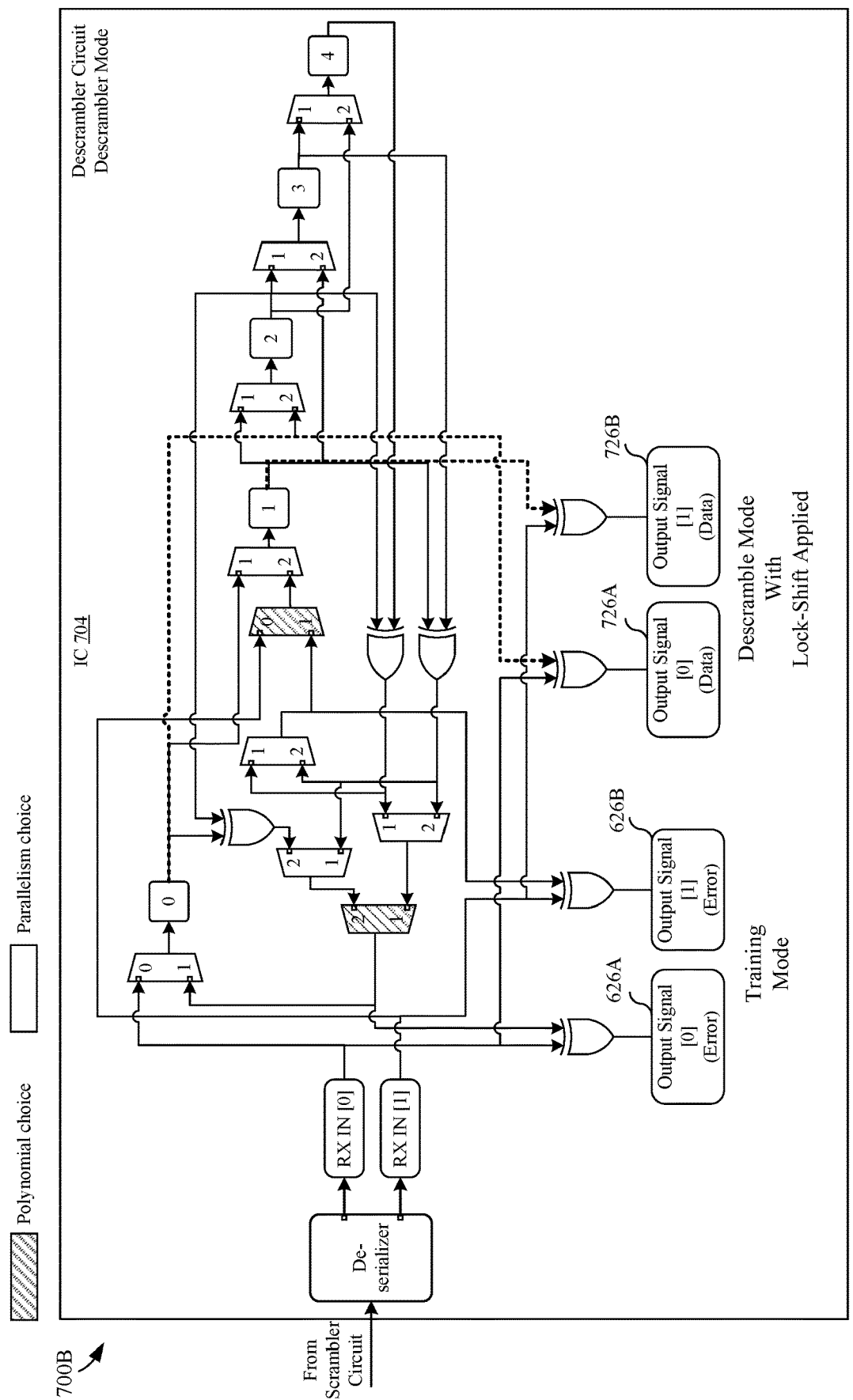

Referring to FIG. 6A, system 600A includes an IC 602 that comprises a scrambler circuit with a parallel transmitter LFSR that is configured in a training mode. Referring to FIG. 6B, system 600B includes an IC 604 that comprises a descrambling circuit with a parallel receiver LFSR configured in a training mode and output nodes 626A and 626B. Referring to FIG. 7A, system 700A includes an IC 702 that comprises a scrambling circuit with a parallel transmitter LFSR configured for a fast scrambling mode after execution of a lock-shift operation. Referring to FIG. 7B, system 700B includes an IC 704 that comprises a scrambling circuit with a parallel receiver LFSR configured in a fast descrambling mode after a lock-shift operation and output nodes 626A, 262B, 726A, and 726B.

The LFSRs of ICs 602, 604, 702, and 704 comprise LFSR circuits with combinatorial elements for implementing serial and/or parallel LFSRs based on multiple polynomials. These example circuits utilize multiplexors and XOR gates. The shaded multiplexors provide a selection of which polynomial to activate. The unshaded multiplexors provide a selection between serial and parallel configurations.

Referring to FIG. 6B, the dotted line in system 600B indicates a data path between a memory element of the receiver LFSR to the output node 626A of the descrambler circuit during a training mode (e.g., before a lock-shift operation).

Referring to FIG. 7B, the dotted lines in system 700B indicate parallel data paths, each of which extend from the output of a memory element of the receiver LFSR to one of the output nodes 726A and 726B of the descrambler circuit during a fast descrambling mode (e.g., after a lock-shift operation).

The LFSRs shown in FIGS. 6A, 6B, 7A, and 7B may support serial communication and parallel two-bit communication. For parallel LFSRs, a transition matrix may be defined that provides a numeric representation of the implemented LFSRs. For every additional degree of parallelism in an LFSR, its transition matrix is squared. The following transition matrices represent polynomials (1) and (2).

The transition matrices (3) for polynomial (1) are configured as follows:

$$\begin{pmatrix} 0 & 0 & 1 & 0 & 1 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \end{pmatrix}^2 = \begin{pmatrix} 0 & 1 & 0 & 1 & 0 \\ 0 & 0 & 1 & 0 & 1 \\ 1 & 0 & 0 & 0 & 0 \\ 0 & 1 & 0 & 0 & 0 \\ 0 & 0 & 1 & 0 & 0 \end{pmatrix} \quad (3)$$

The transition matrices (4) for polynomial (2) are configured as follows:

$$\begin{pmatrix} 0 & 1 & 0 & 1 & 0 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \end{pmatrix}^2 = \begin{pmatrix} 1 & 0 & 1 & 0 & 0 \\ 0 & 1 & 0 & 1 & 0 \\ 1 & 0 & 0 & 0 & 0 \\ 0 & 1 & 0 & 0 & 0 \\ 0 & 0 & 1 & 0 & 0 \end{pmatrix} \quad (4)$$

The LFSRs of FIGS. 6A, 6B, 7A, and 7B provide support for the following types of communication in parallel LFSR circuits based on polynomial (1) or polynomial (2), and matrices (3) or matrices (4):

a. polynomial (1) for serial communication→matrix (3) before it is squared
b. polynomial (1) for parallel communication→matrix (3) after it is squared
c. polynomial (2) for serial communication→matrix (4) before it is squared
d. polynomial (2) for parallel communication→matrix (4) after it is squared A serializer and a deserializer (SERDES) may be included in the scrambler and descrambler circuits respectively for communication of the parallel data from one IC to the other. For example, a serializer may take parallel data and serialize it so that it can be transported on a single fast wire.

As shown in FIG. 6B, during a training mode (or for LFSRs that do not have a lock-shift feature) there are four combinatorial elements in the data path (indicated by the dotted line) between memory element 0 and output node 626A in the descrambler circuit. This figure illustrates that with an increase in polynomials and/or parallelism in an LFSR, the number of combinatorial elements increases and thus time delays in the circuit increase. In industry, a combination of polynomials from the $7^{th}$ degree to the $31^{st}$ degree (i.e., for 31 memory elements) is not uncommon at various parallelism choices. Each degree would have many polynomials to choose from. In one example, configurable 8-bit and 9-bit parallelism may be implemented with polynomials of the $17^{th}$ and the $11^{th}$ degree, where each polynomial has two variants. At this level, the delay due to combinatorial elements becomes significant with respect high communication frequencies and timing violations.

With the lock-shift property, a single combinatorial element (e.g., XOR) may be utilized to sequentially bitwise combine input data (e.g., a bit sequence input to a descrambler circuit or a scrambler circuit), with the output of LFSR memory elements of the descrambler or scrambler circuit, regardless of how many polynomials are implemented in the LFSR. For example, as shown in FIG. 7B, following each of the dotted lines, a single XOR gate is connected between memory element 0 and output node 726A, and also between memory element 1 and output node 726B, which become the data paths after the lock-shift operation is executed. The output signals [0] and [1] generated at output nodes 626A and 626B are used for training mode only. The lock-shift operation makes the data path shorter and uncomplicated with respect to delays as the incoming data is XORed only once for descrambling the data before leaving the descrambler LFSR of system 700B, and continuing through a receive data path, for example, for processing the descrambled data. That output data path in the LFSRs may remain at this short length regardless of how many polynomials are implemented in the descrambler LFSR and which parallelism scheme is used.

Figure 8:
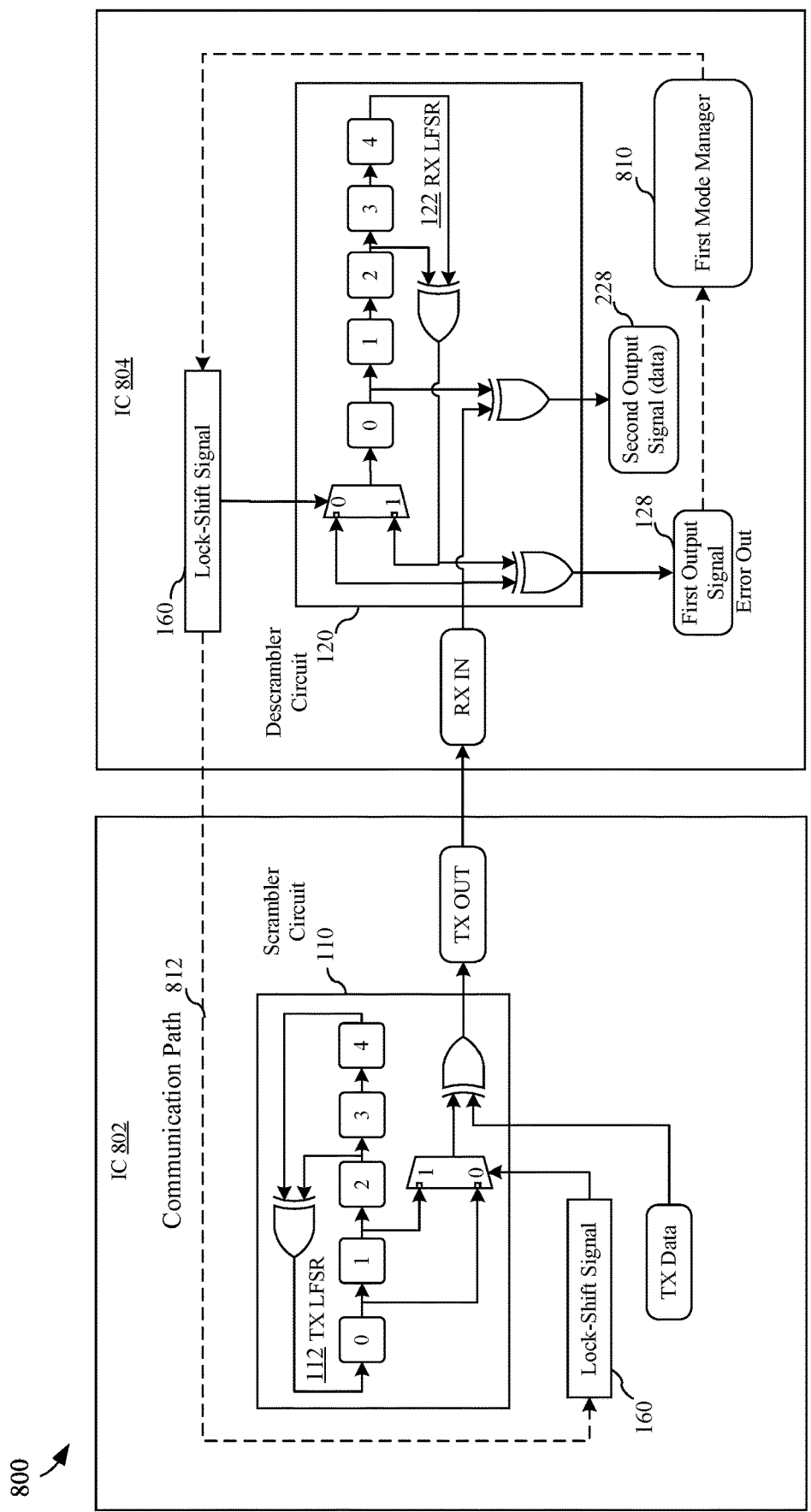
FIG. 8 is block diagram a system comprising a dedicated communication path for communicating a lock-shift signal from a descrambler circuit implemented in one IC to a scrambler circuit implemented in another IC, according to an example embodiment.

As described above, if a lock-shift operation is executed in descrambler circuit LFSR, then a counterpart lock-shift operation should be performed in an LFSR of a corresponding scrambler circuit in order to align the timing of data propagation in the scrambler and descrambler LFSRs and execute an accurate descramble function. In this regard, there are various methods and system configurations for causing a counterpart lock-shift operation to be executed in a corresponding scrambler circuit LFSR. For instance, FIG. 8 is block diagram of a system 800 that illustrates a dedicated communication path for communicating a lock-shift signal from a descrambler circuit implemented in one IC to a scrambler circuit implemented in another IC, according to an example embodiment. As shown in FIG. 8, system 800 includes a primary IC 802 and a secondary IC 804. IC 802 comprises scrambler circuit 110 and first transmitter LFSR 112. IC 804 comprises scrambler circuit 120, first receiver LFSR 122, first receiver LFSR first output signal 128, first receiver LFSR second output signal 228, and a mode manager 810. Also shown in FIG. 8 are lock-shift signal 160 and a communication path 812.

Communication path 812 may comprise any suitable wireless or wireline technology for transporting lock-shift signal 162 from first descrambler circuit 120 in IC 804 to first scrambler circuit 110 in IC 802. For example, communication path 812, may comprise general purpose input-output lines in IC 804 and IC 802 and/or circuit boards hosting IC 804 and IC 802.

Mode manager 810 may comprise suitable logic, circuitry, interfaces and/or code for detecting events in descrambler circuit 120, making decisions based on the detected events, and controlling lock-shift communications and circuit configuration changes (e.g., open circuit to closed circuit changes and/or tap position changes) in the descrambler circuit. For example, mode manager 810 may be configured to monitor first receiver LFSR first output signal 128 in order to detect an indication that first receiver LFSR 122 and first transmitter LFSR 112 are synchronized during a training mode of operation. For example, first receiver LFSR 122 may output a certain binary value (e.g., zero value bits) at first receiver LFSR first output signal 128 when a training bit sequence received from first transmitter LFSF 112 matches a sequence of bits output from first receiver LFSR during a training mode. An output of binary one may indicate that there is a sync-error in the output signal (e.g., a mismatch between the received training bit sequence and the output from receiver LFSR 122). Mode manager 810 may be configured to detect a match in the bit stream for a configured amount of time or a configured number of bits before deciding that transmitter LFSR 112 and receiver LFSR 122 are synchronized. If the synchronization is detected, mode manager 810 may execute a lock-shift operation. For example, mode manager 810 may be configured to transmit lock-shift signal 160 to receiver LFSR 122 (e.g., via one or more multiplexors) to reconfigure first receiver LFSR 122 as a closed loop LFSR in order to generate a pseudorandom bit sequence for conducting descrambling operations, and to change the output tap from first receiver LFSR output port 124 to output port 224 (as described above). Moreover, mode manager 810 may be configured to transmit lock-shift signal 162 to first transmitter LFSR 112 via communication path 812 to initiate the change in the tap position in transmitter LFSR 112 from first transmitter LFSR output port 114 to first transmitter LFSR output port 214 (as described with respect to FIG. 2).

Although FIG. 8 shows only one scrambler circuit and one descrambler circuit, in ICs that include second scrambler and second descrambler circuits, such as IC 102 and IC 104, a second communication path 812 may be connected for communicating a second lock-shift signal (e.g., lock-shift signal 164) from the second descrambler circuit to the second scrambler circuit.

Figure 9:
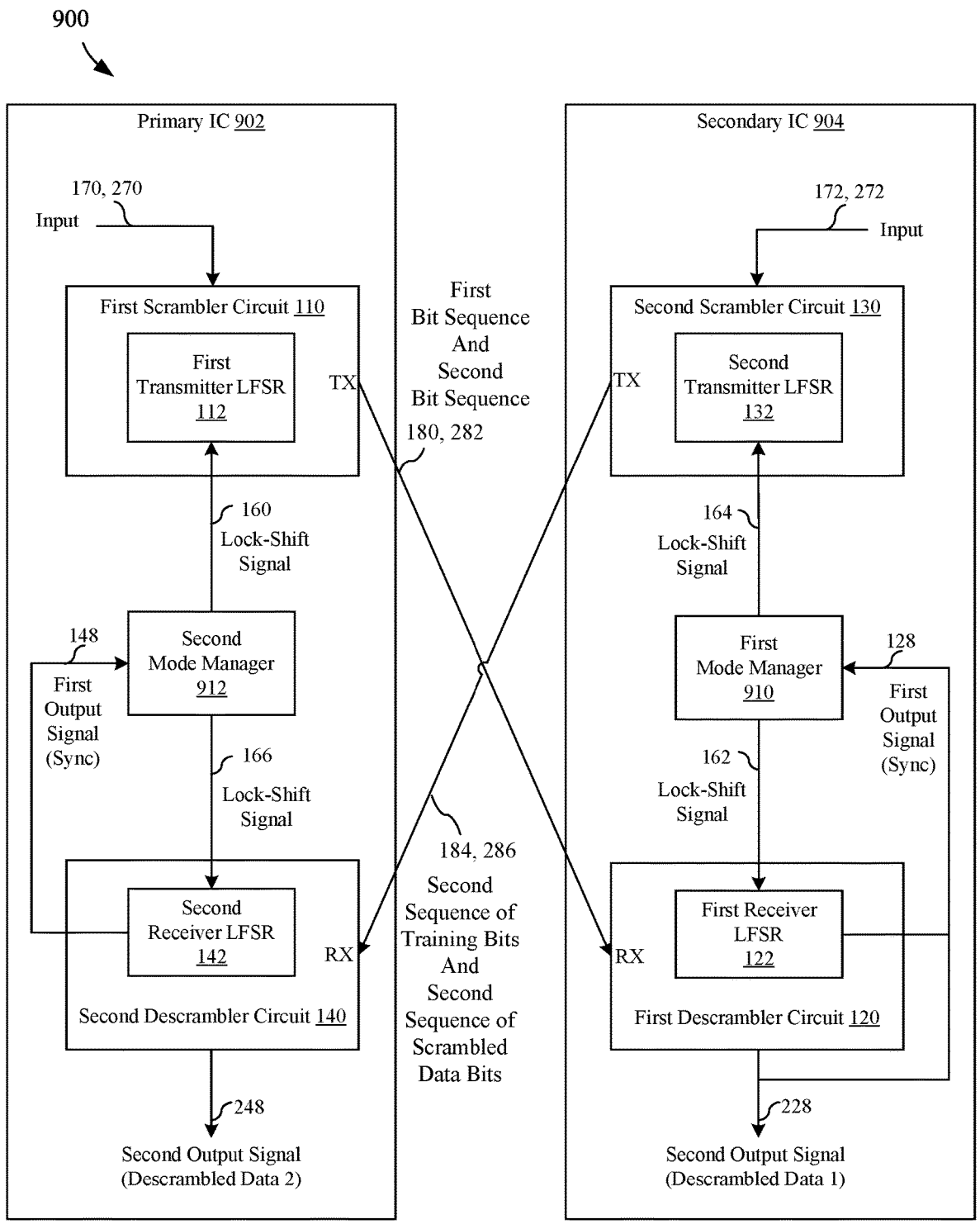
FIG. 9 is a high-level block diagram of a system comprising a pair of ICs including two sets of serial and/or parallel scrambler-descrambler circuits that are configured to indirectly communicate lock-shift information across the ICs, according to an example embodiment.
Figure 10A:
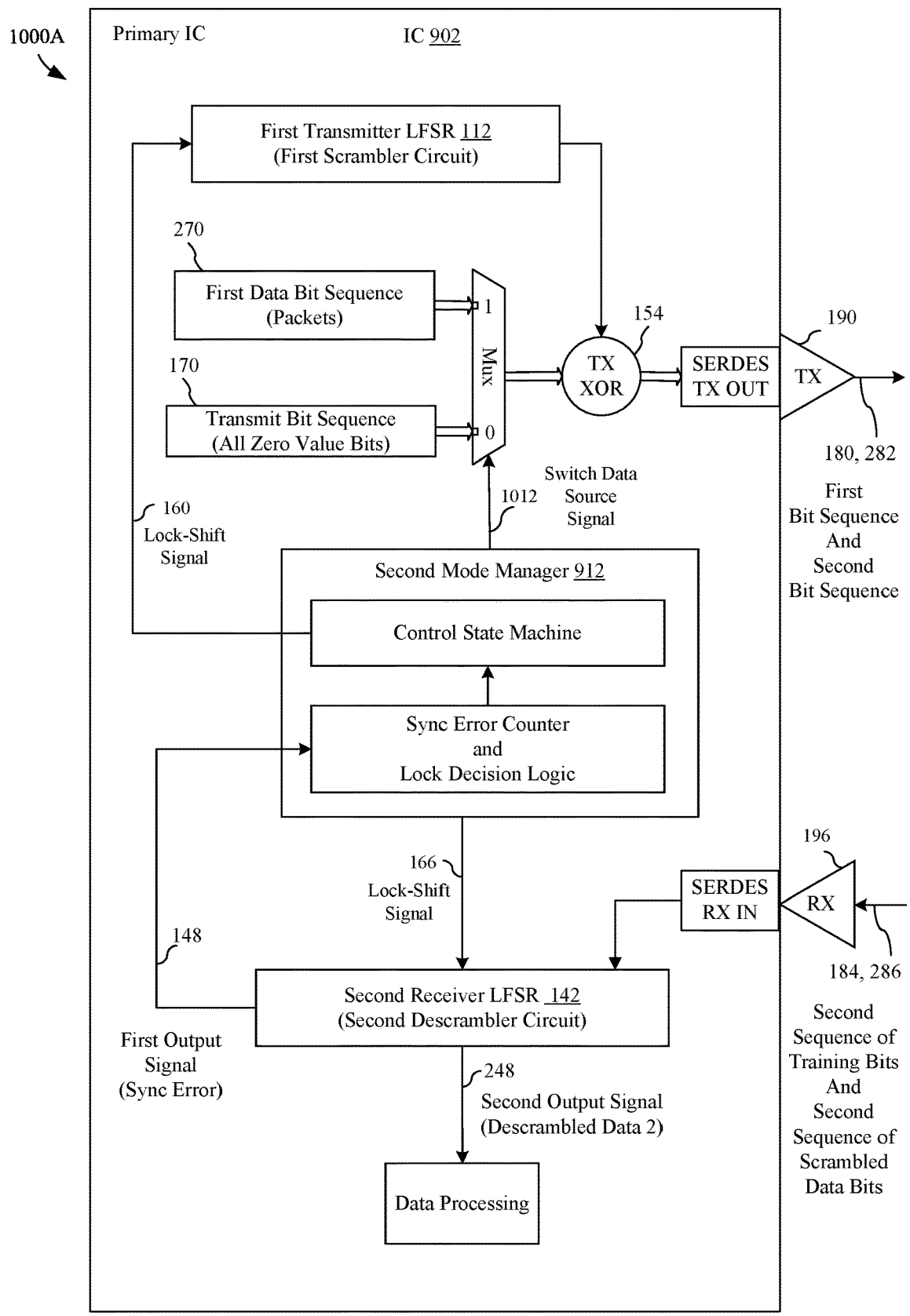
FIG. 10A is a detailed block diagram of a system comprising components of the primary IC shown in FIG. 9, according to an example embodiment.
Figure 10B:
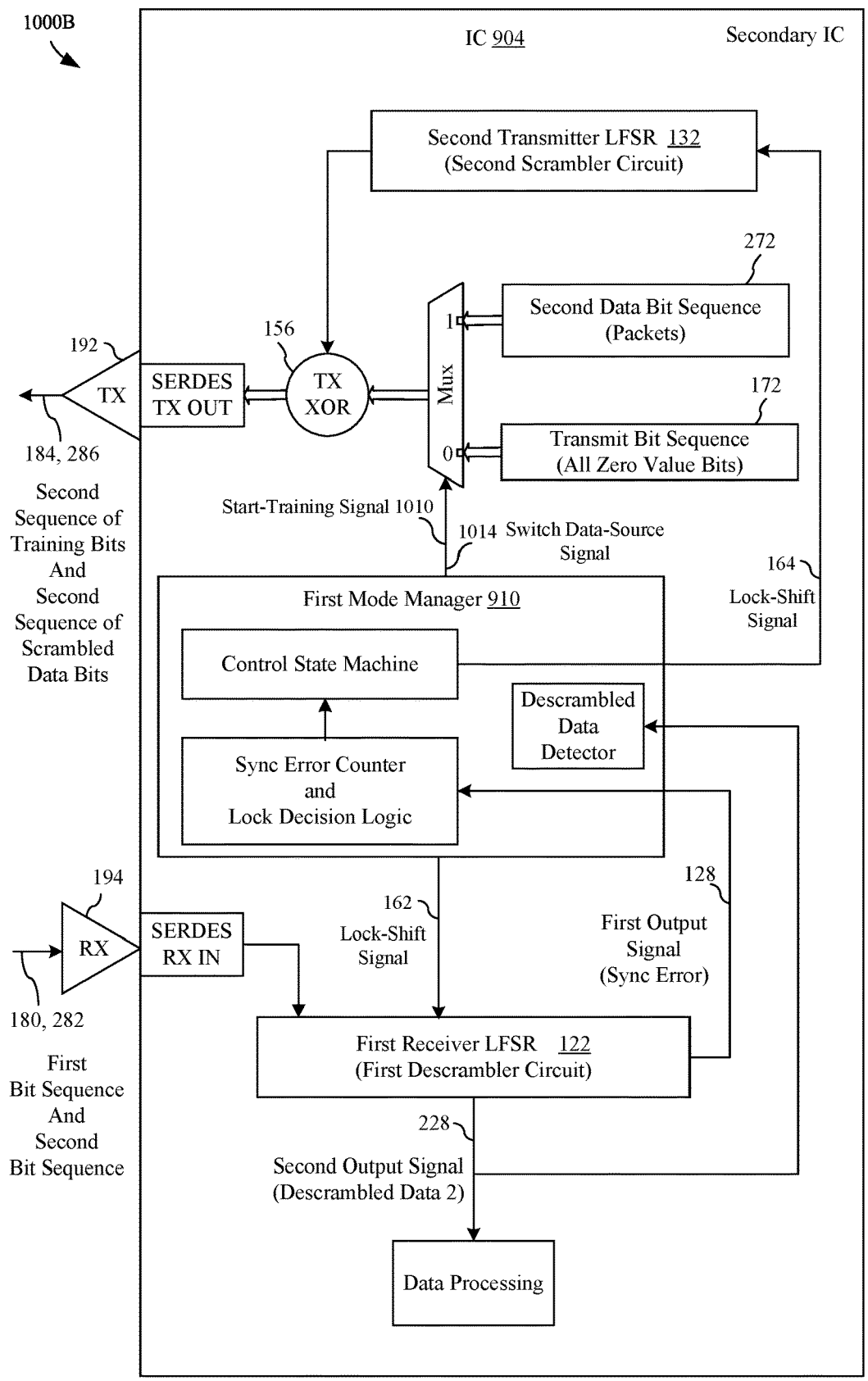
FIG. 10B is a detailed block diagram of a system comprising components of the secondary IC shown in FIG. 9, according to an example embodiment.

Lock-shift information may be communicated or indicated to scrambler and descrambler circuits in various ways as shown in FIGS. 9, 10A, and 10B. For instance, FIG. 9 is a high-level block diagram of a system comprising a pair of ICs including two sets of serial and/or parallel scrambler-descrambler circuits that are configured to indirectly communicate lock-shift information across the ICs, according to an example embodiment. As shown in FIG. 9, system 900 includes a primary IC 902, a secondary IC 904, first scrambler circuit 110, first descrambler circuit 120, second scrambler circuit 130, and second descrambler circuit 140. Primary IC 902 comprises a second mode manager 912, first scrambler circuit 110, and second descrambler circuit 140. First scrambler circuit 110 comprises first transmitter LFSR 112. Second descrambler circuit 140 comprises second receiver LFSR 142, second receiver LFSR first output signal 148 and second receiver LFSR second output signal 248. Secondary IC 904 comprises a first mode manager 910, second scrambler circuit 130, and first descrambler circuit 120. Second scrambler circuit 130 comprises second transmitter LFSR 132. First descrambler circuit 120 comprises first receiver LFSR 122, first receiver LFSR first output signal 128, and first receiver LFSR second output signal 228. Also shown are lock-shift signal 160, lock-shift signal 162, lock-shift signal 164, lock-shift signal 166, transmit bit sequence 170, transmit bit sequence 172, transmit data 270, transmit data 272, first bit sequence 180, second bit sequence 282, second sequence of training bits 184, and second sequence of scrambled data bits 186.

FIG. 10A is a detailed block diagram of a system 1000A comprising components of the primary IC shown in FIG. 9, according to an example embodiment. As shown in FIG. 10A, system 1000A includes primary IC 902. Primary IC 902 comprises second mode manager 912, first transmit LFSR 112 (of first scrambler circuit 110), TX XOR gate 154, and second receiver LFSR 142 (of second descrambler circuit 140). Also shown in FIG. 10A are lock-shift signal 160, lock-shift signal 166, transmit bit sequence 170, transmit data bit sequence 270, first output signal 148, second output signal 248, a switch data-source signal 1012, first bit sequence 180, second bit sequence 282, second sequence of training bits 184, second sequence of scrambled data bits 286, first transmitter 190, and second receiver 196.

FIG. 10B is a detailed block diagram of a system 1000B comprising components of the secondary IC shown in FIG. 9, according to an example embodiment. As shown in FIG. 10B, system 1000B includes secondary IC 904. Secondary IC 904 comprises first mode manager 910, second transmit LFSR 132 (of second scrambler circuit 130), TX XOR gate 156, and first receiver LFSR 122 (of first descrambler circuit 120). Also shown in FIG. 10B are lock-shift signal 162, lock-shift signal 164, transmit bit sequence 172, transmit data bit sequence 272, first output signal 128, second output signal 228, start training signal 1010, switch data-source signal 1014, first bit sequence 180, second bit sequence 282, second sequence of training bits 184, second sequence of scrambled data bits 286, second transmitter 192, and first receiver 194.

First mode manager 910 is communicatively coupled to second scrambler circuit 130 and first descrambler circuit 120. First mode manager 910 comprises suitable logic, circuitry, interfaces, and/or code configured to control operations in secondary IC 904 and transmit control signals, such as for training, fast scrambling, and fast descrambling modes of operation. For example, first mode manager 910 may comprise a processor such as a central processing unit (CPU) or microcontroller and a memory device that is configured to store mode manager 910 program code executable by the processor. First mode manager 910 may comprise a sync-error counter (and/or timer) for detecting when first transmitter LFSR 112 and first receiver LFSR 122 are synchronized (i.e., locked) based on sync error bits in first output signal 128. First mode manager 910 may also comprise lock-decision logic for determining whether or when first transmitter LFSR 112 and first receiver LFSR 122 are synchronized based on output from the sync-error counter. First mode manager 910 may also comprise a descrambled data detector for detecting whether second output signal 228 comprises descrambled data. First mode manager 910 may also comprise a control state machine for determining whether or when to transmit control signals to second transmitter LFSR 132 or first receiver LFSR 122 based on detected first output signal 128 and second output signal 228. For example, the control state machine may be configured to determine when to transmit lock-shift signal 162 to first receiver LFSR 122, and start-training signal 1010 to second transmitter LFSR 122 (for transmitting transmit bit sequence 172) based on first output signal 128. The control state machine may also be configured to determine when to transmit lock-shift signal 164 and switch data-source signal 1014 to second transmitter LFSR 132 based on second output signal 228.

First mode manager 910 is configured to receive first output signal 128 and second output signal 228 from first receiver LFSR 122 and detect a status of first receiver LSFR 122 based on the received signals. For example, first mode manager 910 may be configured to detect whether first receiver LFSR 122 and first transmitter LFSR 112 are synchronized based on first output signal 128, and may detect whether first receiver LFSR 122 of descrambler circuit 120 is outputting descrambled data based on second output signal 228.

Second mode manager 912 is communicatively coupled to first scrambler circuit 110 and second descrambler circuit

140. Second mode manager 912 comprises suitable logic, circuitry, interfaces, and/or code configured to control operations in primary IC 902 (i.e., transmit control signals), such as for training, fast scrambling, and fast descrambling modes of operation. For example, second mode manager 912 may comprise a processor such as a central processing unit (CPU) or microcontroller and a memory device that is configured to store mode manager 912 program code executable by the processor. Second mode manager 912 may comprise a sync-error counter (and/or timer) for detecting when second receiver LFSR 142 and second transmitter LFSR 132 are synchronized (i.e., locked) based on sync error bits in first output signal 148. Second mode manager 912 may also comprise lock decision logic for determining whether or when second transmitter LFSR 132 and second receiver LFSR 142 are synchronized based on output from the sync-error counter. Second mode manager 912 may also comprise a control state machine for determining when to transmit control signals to second receiver LFSR 142 and first transmitter LFSR 112 based on first output signal 128. For example, the control state machine may determine when to transmit lock-shift signal 166 to second receiver LFSR 142, and when to transmit lock-shift signal 160 and switch data-source signal 1012 to first transmitter LFSR 112 based on first output signal 148.

Second mode manager 912 is configured to receive first output signal 148 from second receiver LFSR 142 and detect a status of second receiver LSFR 142 based on the received signal. For example, second mode manager 912 may be configured to detect whether second receiver LSFR 142 and second transmitter LFSR 132 are synchronized based on first output signal 148.

In general, the mode managers in IC 902 and IC 904 control a process of (1) training the descrambler circuit LFSRs in each IC, (2) causing lock-shift operations to execute in each of the descrambler circuit LFSRs and corresponding lock-shift operations to execute in each of the scrambler circuit LFSRs, and (3) conducting fast scrambling and fast descrambling operations in the scrambling circuit LFSRs and the descrambling circuit LFSRs. The overall process evolves by triggering actions in a first IC that cause events to occur in the second IC. For example, one mode manager may trigger a transmission action from its own IC that causes events to occur in the corresponding IC. In turn, the corresponding IC detects events in its own IC, and in response to detecting the events, triggers actions (including transmission actions) by its own IC. These actions then cause events to occur in the first IC, and so on. In this manner, the system effectively communicates when to execute lock-shift operations in opposing ICs, in order to implement fast scrambler-descrambler operations in two sets of scrambler-descrambler circuit pairs without using a dedicated I/O line between ICs for such communications (as shown in FIG. 8). In general, with the scrambler and descrambler circuits arranged as in the layout shown in FIG. 9, an overall communication path between IC 902 and IC 904 for implementing lock-shift operations may flow in a figure eight pattern from first scrambler circuit 110 in IC 902 out to first descrambler circuit 120 in IC 904, then up to second scrambler circuit 130 in IC 904, and out to second descrambler circuit 140 in IC 902, then up to first scrambler circuit 110 in IC 902, which is described in more detail as follows. However, the disclosure is not limited to any particular arrangement of scrambler and descrambler circuits in hosting ICs (e.g., as shown in FIG. 9), and any suitable arrangement of scrambler and descrambler circuits may be utilized to implement lock-shift operations and fast scrambling and descrambling as described herein.

As described above, FIG. 9 provides a high-level view of ICs 902 and 904 and the communication paths for implementing fast scrambling and fast descrambling with reduced timing violations. At a high level, the implementation may unfold as follows.

Figure 11B:
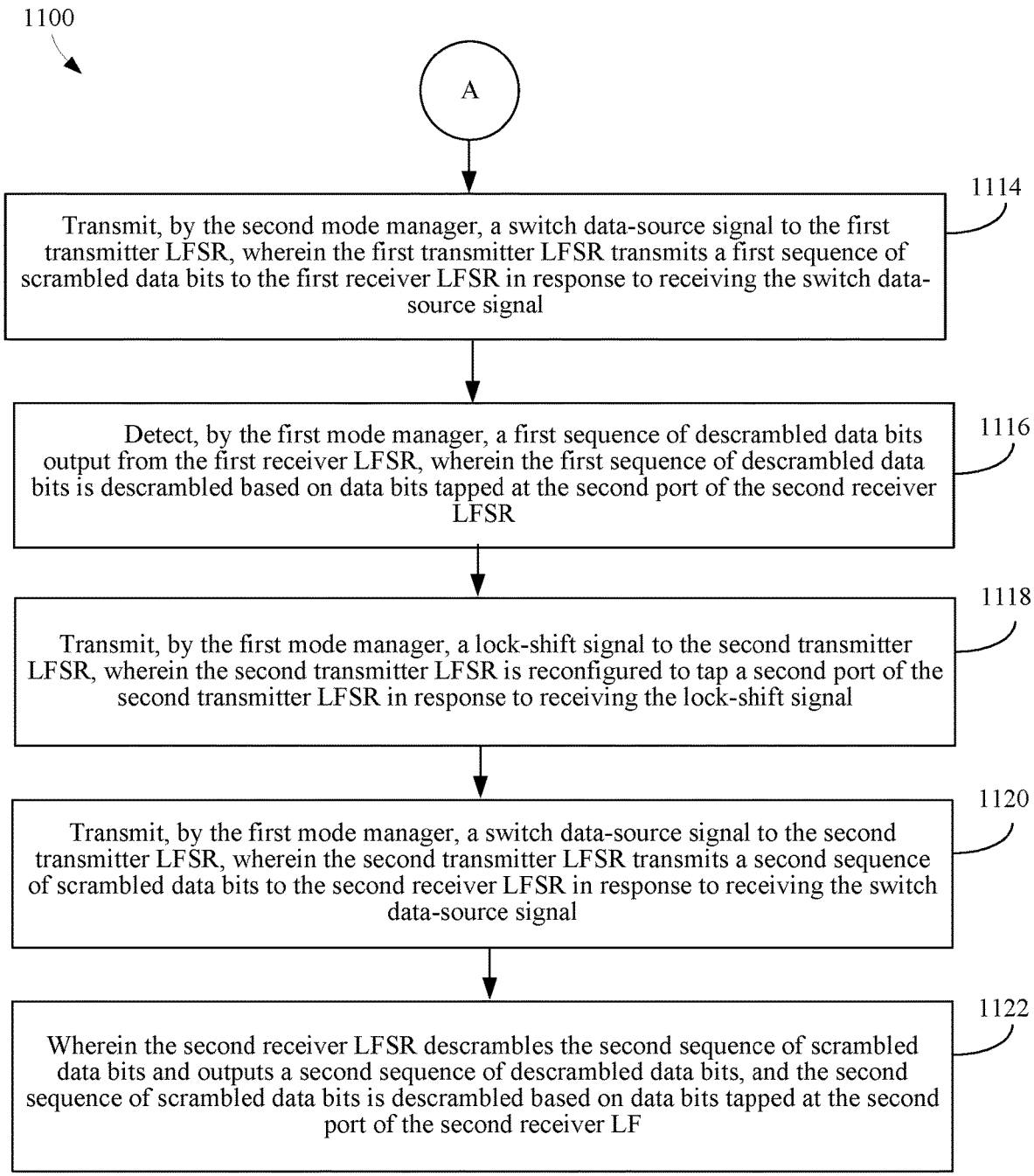

FIGS. 11A and 11B comprise a flowchart 1100 of a method for implementing fast scrambling and fast descrambling operations in two ICs comprising serial or parallel scrambler-descrambler circuits, according to an embodiment. Flowchart 1100 may be implemented in systems 100, 200, 400, 500, 600A, 600B, 700A, 700B, 900, 1000A, and 1000B. For purposes of illustration, flowchart 1100 is described with reference to FIG. 9, FIG. 10A, FIG. 10B, and FIG. 2. Other structural and operational embodiments will be apparent to persons skilled in the relevant art(s) based on the following discussion regarding flowchart 1100.

Flowchart 1100 begins with step 1102. In step 1102, a first mode manager detects synchronization of a first receiver LFSR and a first transmitter LFSR during a training mode, wherein a first sequence of training bits is tapped at a first port of the first receiver LFSR through which the first sequence of training bits is shifted. For example, second mode manager 912 may be configured to transmit a control signal to first transmitter LFSR 112 to initiate a training mode of operation in first transmitter LFSR 112. First transmitter LFSR 112 may be configured to transmit a first sequence of training bits to first receiver LFSR 122. The sequence of training bits may comprise a pseudorandom bit sequence generated by first transmitter LFSR 112 utilizing first transmitter LFSR first port 114. First receiver LFSR 122 may receive the first sequence of training bits and output first output signal 128 that indicates whether first transmitter LFSR 112 and first receiver LFSR are synchronized. First mode manager 910 may be configured to receive first output signal 128 from first receiver LFSR 122 and detect synchronization between first receiver LFSR 122 and first transmitter LFSR 112 during the training mode of operation, where the first sequence of training bits may be shifted through first receiver LFSR 122, and first receiver LFSR 122 may be tapped at a first port (e.g., first receiver LSFR first port 124 including outputs from memory elements 2 and 4, see FIG. 1) for generating the first output signal 128.

In step 1104, the first mode manager may transmit a lock-shift signal to the first receiver LFSR based on the detected synchronization, wherein the first receiver LFSR is reconfigured to tap a second port of the first receiver LFSR in response to receiving the lock-shift signal. For example, first mode manager 910 may be configured to transmit lock-shift signal 162 to first receiver LFSR 122 based on the detected synchronization. First receiver LFSR 122 may be reconfigured to tap a second port of first receiver LFSR 122 in response to receiving lock-shift signal 162 (e.g., first receiver LFSR 122 executes a lock-shift operation by tapping first receiver LFSR second port 224, see FIG. 2).

In step 1106, the first mode manager may transmit a start-training signal to a second transmitter LFSR, wherein the second transmitter LFSR is configured to transmit a second sequence of training bits (e.g., a sequence of pseudorandom bits) to a second receiver LFSR in response to receiving the start-training signal. For example, first mode manager 910 may be configured to transmit start-training signal 1010 to second transmitter LFSR 132. Second transmitter LFSR 132 may be configured to transmit a second sequence of training bits 184 to second receiver LFSR 142 in response to receiving start-training signal 1010.

In step 1108, a second mode manager may detect synchronization of the second receiver LFSR and the second transmitter LFSR during a training mode, wherein the second sequence of training bits is tapped at a first port of the second receiver LFSR through which the second sequence of training bits is shifted. For example, second mode manager 912 may be configured to detect synchronization of second receiver LFSR 142 and second transmitter LFSR 132 during a training mode of second receiver LFSR 142. The second sequence of training bits 184 may be shifted through second receiver LFSR 142 and the second sequence of training bits 184 may be tapped at a first port of second receiver LFSR 142 (e.g., second receiver LFSR first port 144, see FIG. 1).

In step 1110, the second mode manager may transmit a lock-shift signal to the second receiver LFSR, wherein the second receiver LFSR is reconfigured to tap a second port of the second receiver LFSR in response to receiving the lock-shift signal. For example, second mode manager 912 may be configured to transmit lock-shift signal 166 to second receiver LFSR 142. Second receiver LFSR 142 may be reconfigured to tap a second port (e.g., second receiver LFSR second port 244, see FIG. 2) in response to receiving lock-shift signal 166. In other words, second receiver LFSR 142 executes a lock-shift operation. Although second receiver LFSR 142 may have executed a lock-shift operation by reconfiguring its tap position, second receiver LFSR 142 may still receive training bits from second transmitter LFSR 132 and may not yet output descrambled data bits.

In step 1112, the second mode manager may transmit a lock-shift signal to the first transmitter LFSR, wherein the first transmitter LFSR is reconfigured to tap a second port of the first transmitter LFSR in response to receiving the lock-shift signal. For example, second mode manager 912 may be configured to transmit a lock-shift signal 160 to first transmitter LFSR 112. First transmitter LFSR 112 may be reconfigured to tap a second port (e.g., first transmitter LFSR second port 214, see FIG. 2) in response to receiving lock-shift signal 160. In other words, first transmitter LFSR 112 executes a lock-shift operation.

In step 1114, the second mode manager may transmit a switch data-source signal to the first transmitter LFSR, wherein the first transmitter LFSR transmits a first sequence of scrambled data bits to the first receiver LFSR in response to receiving the switch data-source signal. For example, second mode manager 912 may be configured to transmit a switch data-source signal (e.g., switch data-source signal 1012 shown in FIG. 10A) to first transmitter LFSR 112. First transmitter LFSR 112 may be configured to transmit a first sequence of scrambled data bits (e.g., second bit sequence 282) to first receiver LFSR 122 in response to receiving the switch data-source signal. More specifically, second mode manager 912 may be configured to transmit switch data-source signal 1012 to a multiplexor for switching the data source selection from transmit bit sequence 170 to first data bit sequence 270. First data bit sequence 270 may comprise information bearing data that may be scrambled by first scrambler circuit 110 by bitwise combining, in LFSR XOR gate 154, first data bit sequence 270 with output from transmit LFSR 112 that is tapped at first transmitter LFSR second port 214 (see FIGS. 2 and 10A). In this manner, first scrambler circuit 110 transmits scrambled data to first descrambler circuit 120.

In step 1116, the first mode manager detects a first sequence of descrambled data bits output from the first receiver LFSR, wherein the first sequence of descrambled data bits is generated based on descrambling with data bits tapped at the second port of the second receiver LFSR. For example, first descrambler circuit 120 may receive the scrambled data from first scrambler circuit 110 and fast descramble the scrambled data utilizing first receiver LFSR second port 224. First mode manager 910 may be configured to detect a first sequence of descrambled data bits output from first receiver LFSR 122 (e.g., second output signal 228 may comprise the first sequence of descrambled data bits). The first sequence of descrambled data bits may be generated based on descrambling with data bits tapped at first receiver LSFR second port 244 (see FIG. 2).

In step 1118, transmitting, by the first mode manager, a lock-shift signal to the second transmitter LFSR, wherein the second transmitter LFSR is reconfigured to tap a second port of the second transmitter LFSR in response to receiving the lock-shift signal. For example, first mode manager 910 may be configured to transmit a lock-shift signal (e.g., lock-shift signal 164) to second transmitter LFSR 132. Second transmitter LFSR 132 may be reconfigured to tap a second port of the second transmitter LFSR (e.g., second transmitter LSFR second port 234 shown in FIG. 2) in response to receiving the lock-shift signal.

In step 1120, the first mode manager transmits a switch data-source signal to the second transmitter LFSR, wherein the second transmitter LFSR transmits a second sequence of scrambled data bits to the second receiver LFSR in response to receiving the switch data-source signal. For example, first mode manager 910 may be configured to transmit a switch data-source signal (e.g., switch data-source signal 1014 shown in FIG. 10B) to second transmitter LFSR 132. Second transmitter LFSR 132 may be configured to transmit second sequence of scrambled data bits 286 to second receiver LFSR 142 in response to receiving the switch data-source signal. For example, first mode manager 910 may be configured to transmit switch data-source signal 1014 to a multiplexor for switching the data source selection from transmit bit sequence 172 to second data bit sequence 272. Second data bit sequence 272 may comprise information bearing data that may be scrambled by second scrambler circuit 130 by bitwise combining, in LFSR XOR gate 156, second data bit sequence 272 with output from second transmit LFSR 132 that is tapped at second transmitter LFSR second port 234 (see FIGS. 2 and 10B). In this manner, second scrambler circuit 130 transmits scrambled data to second descrambler circuit 140.

In step 1122, the second receiver LFSR descrambles the second sequence of scrambled data bits and outputs a second sequence of descrambled data bits, and the second sequence of scrambled data bits is descrambled based on a bit sequence tapped at the second port of the second receiver LFSR. For example, second receiver LFSR 142 may be configured to descramble second sequence of scrambled data bits 286 received from second transmitter LFSR 132, and output a second sequence of descrambled data bits (e.g., second output signal 248 may comprise the second sequence of descrambled data bits). In this regard, second sequence of scrambled data bits 286 may be descrambled based on a sequence of bits tapped at the second port of second receiver LFSR 142 (e.g., tapped at second receiver LFSR second port 244 that may comprise an output port of memory element 0). At this point, all of the scrambler and descrambler circuits have executed a lock-shift operation and both of the scrambler circuits are transmitting fast scrambled data (e.g., information bearing data rather than a pseudorandom bit sequence). Both descrambler circuits are configured for fast descrambling based on their lock-shift reconfigurations, and are outputting descrambled data.

Further example methods for implementing fast scrambling and fast descrambling operations utilizing lock-shift operations are described in detail as follows.

Figure 12:
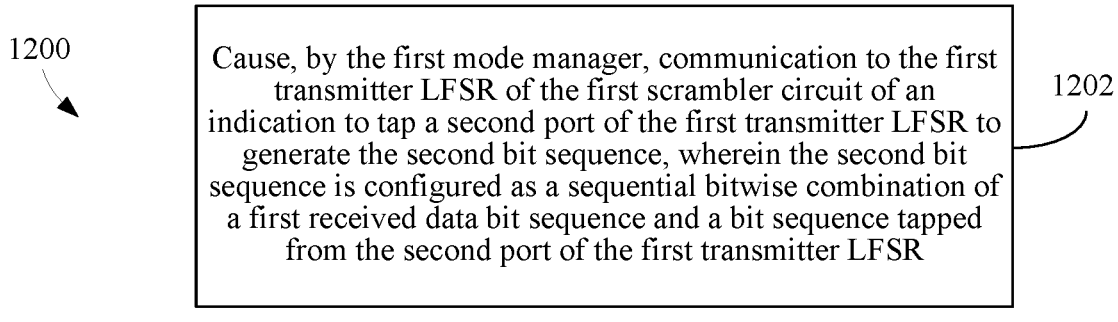
FIG. 12 is a flowchart of a method for executing a lock-shift operation in a first transmitter LFSR, according to an example embodiment.

FIG. 12 is a flowchart 1200 of a method for executing a lock-shift operation in a first transmitter LFSR, according to an example embodiment. Flowchart 1200 may be implemented in systems 100, 200, 400, 500, 600A, 600B, 700A, 700B, 800, 900A, 900B, 1000A, and 1000B. For purposes of illustration, flowchart 1200 is described with reference to FIGS. 2, 9, and 10B. Other structural and operational embodiments will be apparent to persons skilled in the relevant art(s) based on the following discussion regarding flowchart 1200.

Flowchart 1200 includes step 1202. In step 1202, the first mode manager causes communication to the first transmitter LFSR of the first scrambler circuit of an indication to tap a second port of the first transmitter LFSR to generate the second bit sequence, wherein the second bit sequence is configured as a sequential bitwise combination of a received first data bit sequence and a bit sequence tapped from the second port of the first transmitter LFSR. For example, first mode manager 910 may be configured to cause communication to first transmitter LFSR 112 of first scrambler circuit 110 of an indication to tap a second port (e.g., first scrambler circuit second port 214 shown in FIG. 2) of first transmitter LFSR 112 to generate the second bit sequence 282. The second bit sequence 282 is configured as a sequential bitwise combination (e.g., combined at XOR gate 154 of FIGS. 2 and 10A) of a received first data bit sequence (e.g. TX data 270 shown in FIG. 2 and first data bit sequence 270 shown in FIG. 10A) and a bit sequence tapped from the second port of first transmitter LFSR 112 (e.g., first scrambler circuit second port 214 shown in FIG. 2). Second bit sequence 282 may also be referred to as a first sequence of scrambled data bits 282.

Figure 13:
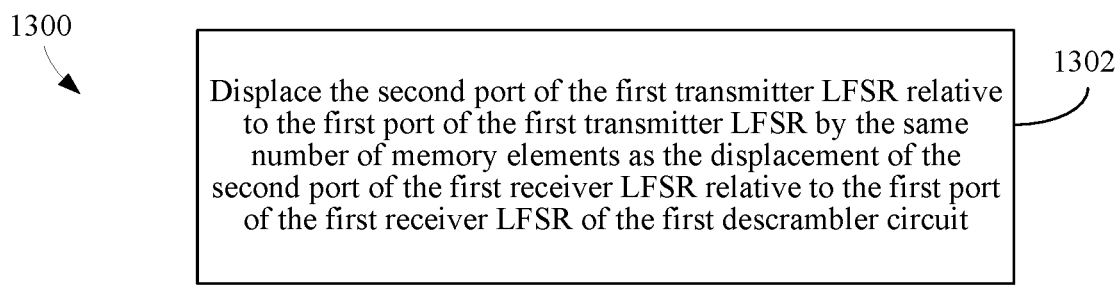
FIG. 13 is a flowchart of a method for executing a corresponding lock-shift operation in a first transmitter LFSR relative to a lock-shift operation executed in first receiver transmitter LFSR, according to an example embodiment.

FIG. 13 is a flowchart 1300 of a method for executing a corresponding lock-shift operation in a first transmitter LFSR relative to a lock-shift operation executed in first receiver transmitter LFSR, according to an example embodiment. Flowchart 1300 may be implemented in systems 100, 200, 400, 500, 600A, 600B, 700A, 700B, 800, 900A, 900B, 1000A, and 1000B. For purposes of illustration, flowchart 1300 is described with reference to FIGS. 2, 10A, and 10B. Other structural and operational embodiments will be apparent to persons skilled in the relevant art(s) based on the following discussion regarding flowchart 1300.

Flowchart 1300 includes step 1302. In step 1302, the second port of the first transmitter LFSR is displaced relative to the first port of the first transmitter LFSR by the same number of memory elements as the displacement of the second port of the first receiver LFSR relative to the first port of the first receiver LFSR of the first descrambler circuit. For example, first transmitter LFSR second port 214 is displaced relative to first transmitter LFSR first port 114 of first scrambler circuit 110 by the same number of memory elements as in the displacement of first receiver LFSR second port 224 relative to first receiver LFSR first port 124 of first descrambler circuit 120. In other words, a lock-shift operation in a receive LFSR that displaces a tap by one memory element (i.e., shifts the tap by a given time interval such as a clock cycle) may be applied to a corresponding transmit LFSR by displacing a tap in the corresponding transmit LFSR by one memory element (or the given time interval such as a clock cycle). In this manner, the transmit LFSR and receive LFSR may maintain synchronization after a lock-shift operation. As described above, changing an output port in the descrambler circuit causes a time shift in the output from the receive LFSR, which may disrupt synchronization with the corresponding scrambler LFSR. Therefore, if a lock-shift operation is executed in descrambler circuit LFSR, then a counterpart lock-shift operation should be performed in the LFSR of a corresponding scrambler circuit in order to align the timing of data propagation in the scrambler and descrambler LFSRs and to execute an accurate descramble function. In this manner, the scrambler and descrambler circuits are configured to perform fast scrambling and fast descrambling operations for higher rate communications of data between ICs and/or between computing devices.

Figure 14:
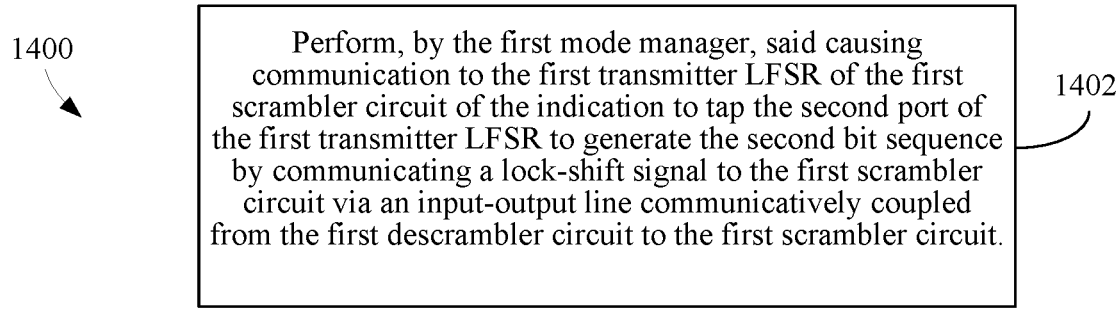
FIG. 14 is a flowchart of a method for communicating a lock-shift signal to a scrambler circuit located in a one IC from a mode manager located in another IC via an input-output line, according to an example embodiment.

FIG. 14 is a flowchart of a method for communicating a lock-shift signal to a scrambler circuit located in a one IC from a mode manager located in another IC via an input-output line, according to an example embodiment. Flowchart 1400 may be implemented in systems 100, 200, 400, 500, 600A, 600B, 700A, 700B, and 800. For purposes of illustration, flowchart 1400 is described with reference to FIG. 8 and FIG. 2. Other structural and operational embodiments will be apparent to persons skilled in the relevant art(s) based on the following discussion regarding flowchart 1400.

Flowchart 1400 includes step 1402. In step 1402, the first mode manager may perform said causing communication to the first transmitter LFSR of the first scrambler circuit of the indication to tap the second port of the first transmitter LFSR to generate the second bit sequence by communicating a lock-shift signal to the first scrambler circuit via an input-output line communicatively coupled from the first descrambler circuit to the first scrambler circuit. For example, first mode manager 810 may be configured to perform said causing communication to first transmitter LFSR 112 of first scrambler circuit 110 of the indication to tap the second port of first transmitter LFSR 112 (e.g., first transmitter LFSR second port 214 shown in FIG. 2) to generate the second bit sequence 282 by communicating lock-shift signal 160 to first scrambler circuit 110 via input-output line 812 communicatively coupled from first descrambler circuit 120 to first scrambler circuit 110.

Figure 15:
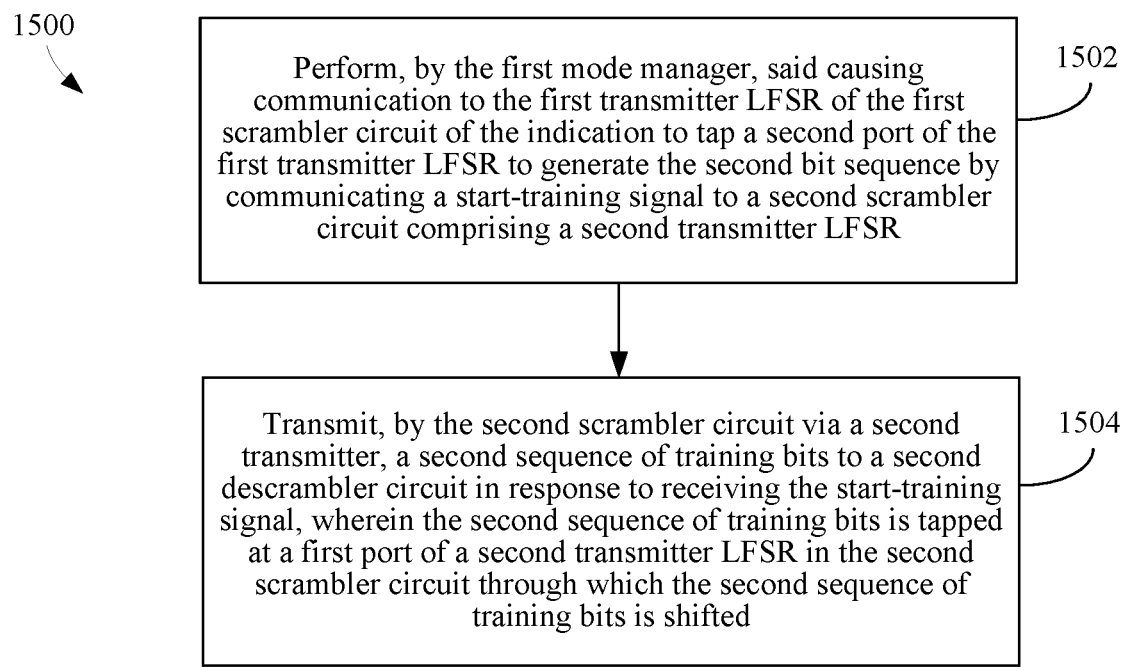
FIG. 15 is a flowchart of a method for initiating communications between a first IC and a second IC for implementing lock-shift operations in both ICs, according to an example embodiment.

FIG. 15 is a flowchart 1500 of a method for initiating communications between a first IC and a second IC for implementing lock-shift operations in both ICs, according to an example embodiment. Flowchart 1500 may be implemented in systems 100, 200, 400, 500, 600A, 600B, 700A, 700B, 900A, 900B, 1000A, and 1000B. For purposes of illustration, flowchart 1500 is described with reference to FIGS. 2, 9, 10A, and 10B. Other structural and operational embodiments will be apparent to persons skilled in the relevant art(s) based on the following discussion regarding flowchart 1500.

Flowchart 1500 begins with step 1502. In step 1502, the first mode manager performs said causing communication to the first transmitter LFSR of the first scrambler circuit of the indication to tap a second port of the first transmitter LFSR to generate the second bit sequence by communicating a start-training signal to a second scrambler circuit comprising a second transmitter LFSR. For example, first mode manager 910 performs said causing communication to first transmitter LFSR 112 of first scrambler circuit 110 of the indication to tap a second port (e.g., first transmitter LFSR second port 214 shown in FIG. 2) of first transmitter LFSR 112 to generate second bit sequence 282 by communicating start-training signal 1010 (see FIG. 10B) to second scrambler circuit 130 comprising second transmitter LFSR 132.

By transmitting start-training signal 1010 to second scrambler circuit 130, mode manager 910 initiates a series of events that propagate through IC 904 and IC 902 and eventually cause mode manager 912 to transmit lock-shift signal 160 to first transmitter LSFR 112, which is described as follows.

In step 1504, the second scrambler circuit transmits via a second transmitter, a second sequence of training bits to a second descrambler circuit in response to receiving the start-training signal, wherein the second sequence of training bits is tapped at a first port of a second transmitter LFSR in the second scrambler circuit through which the second sequence of training bits is shifted. For example, second scrambler circuit 130 is configured to transmit, via second transmitter 192 in second scrambler circuit 130, a second sequence of training bits 184 to second descrambler circuit 140 in response to receiving start-training signal 1010, wherein the second sequence of training bits 184 is tapped at second transmitter LFSR first port 134 of second transmitter LFSR 132 in second scrambler circuit 130 through which the second sequence of training bits 184 is shifted.

Figure 16A:
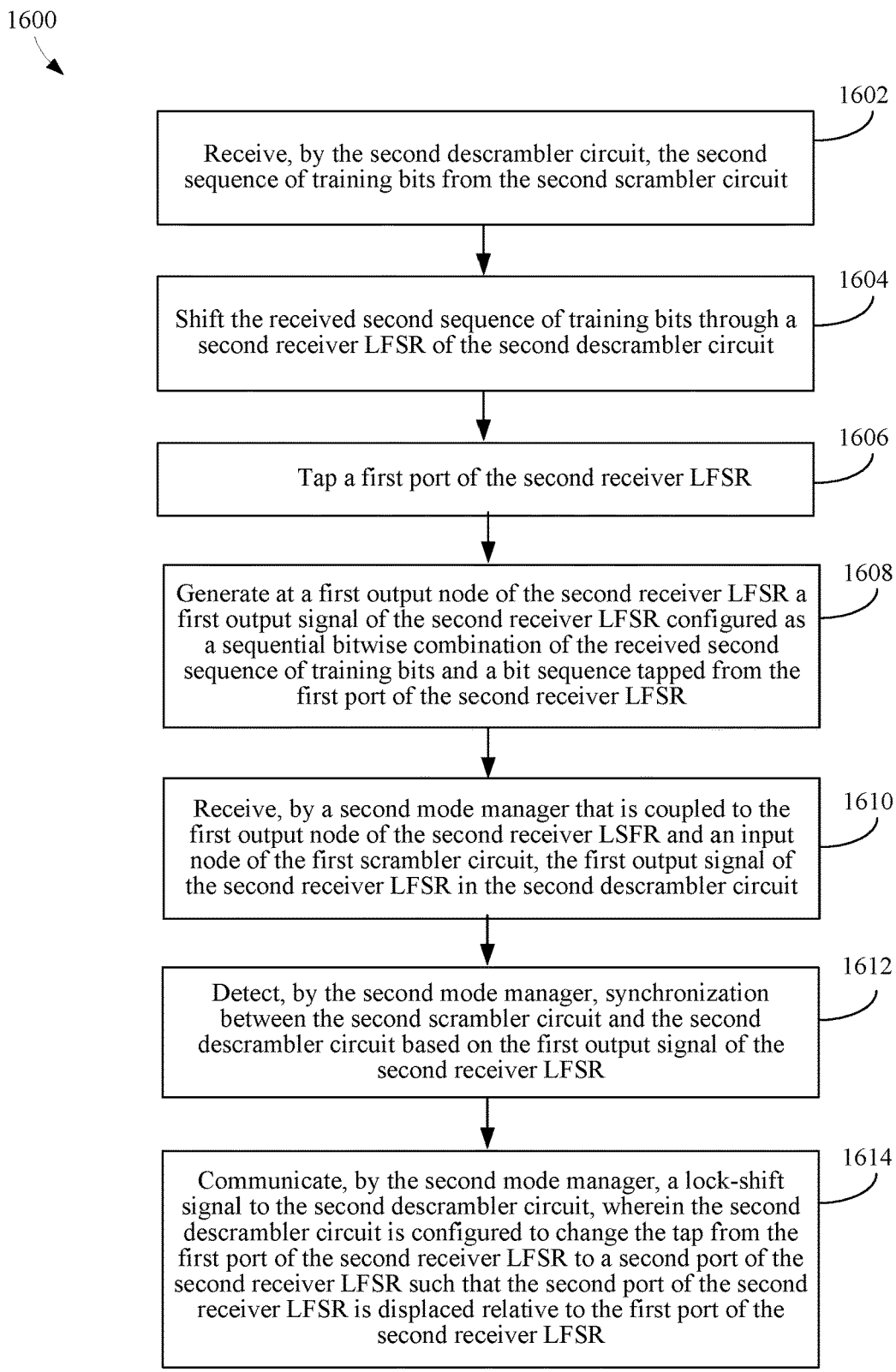
FIGS. 16A and 16B comprise a flowchart of a method for causing a lock-shift operation in a second receiver LFSR, and causing a lock-shift operation and transmission of fast scrambled data bits in a first transmitter LFSR, according to an example embodiment.
Figure 16B:
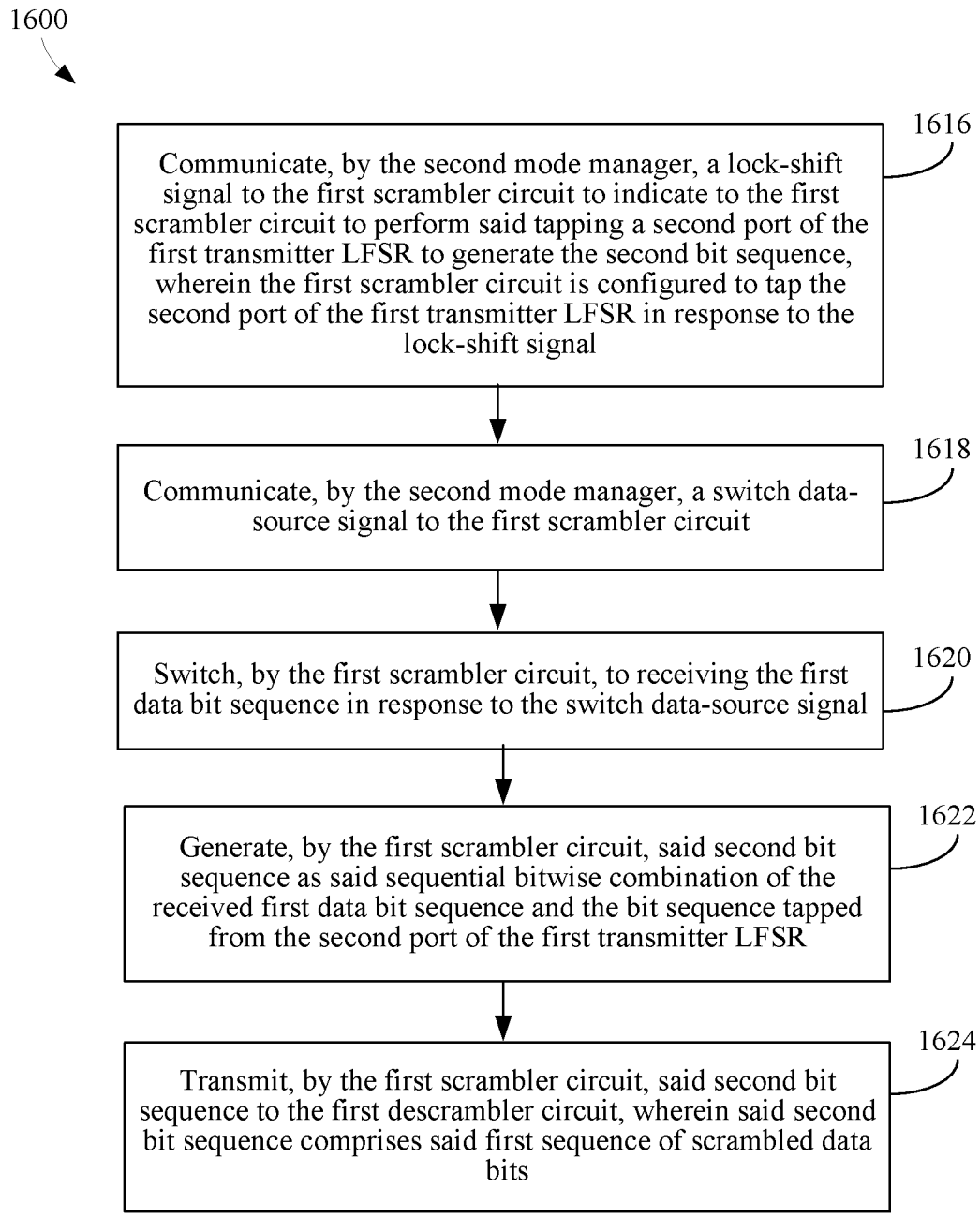

FIGS. 16A and 16B comprise a flowchart 1600 of a method for causing a lock-shift operation in a second receiver LFSR, and causing a lock-shift operation and transmission of fast scrambled data bits in a first transmitter LFSR, according to an example embodiment. Flowchart 1600 may be implemented in systems 100, 200, 400, 500, 600A, 600B, 700A, 700B, 900A, 900B, 1000A, and 1000B. For purposes of illustration, flowchart 1600 is described with reference to FIGS. 2, 9, 10A, and 10B. Other structural and operational embodiments will be apparent to persons skilled in the relevant art(s) based on the following discussion regarding flowchart 1600.

Flowchart 1600 begins with step 1602. In step 1602, the second descrambler circuit receives the second sequence of training bits from the second scrambler circuit. For example, second descrambler circuit 140 is configured to receive second sequence of training bits 184 from second scrambler circuit 130.

In step 1604, the received second sequence of training bits is shifted through a second receiver LFSR of the second descrambler circuit. For example, received second sequence of training bits 184 may be shifted through second receiver LFSR 142 of second descrambler circuit 140.

In step 1606, a first port of the second receiver LFSR is tapped. For example, second receiver LFSR first port 144 of second receiver LFSR 142 is tapped. Second receiver LFSR first port 144 may comprise the output ports of memory elements 2 and 4 in second receiver LFSR 142 (see FIG. 2).

In step 1608, at a first output node of the second receiver LFSR there is generated a first output signal of the second receiver LFSR configured as a sequential bitwise combination of the received second sequence of training bits and a bit sequence tapped from the first port of the second receiver LFSR. For example, at first output node 146 of second receiver LFSR 142, first output signal 148 of second receiver LFSR 142 is generated. First output signal 148 is configured as a sequential bitwise combination of the received second sequence of training bits 184 and a bit sequence tapped from second receiver LFSR first port 144 (i.e., output of memory elements 2 and 4) of second receiver LFSR 142.

In step 1610, a second mode manager that is coupled to the first output node of the second receiver LSFR and an input node of the first scrambler circuit, receives the first output signal of the second receiver LFSR in the second descrambler circuit. For example, second mode manager 912 that is coupled to first output node 146 of second receiver LSFR 142 and an input node (not shown) of first scrambler circuit 110, is configured to receive first output signal 148 of second receiver LFSR 142 in second descrambler circuit 140.

In step 1612, the second mode manager detects synchronization between the second scrambler circuit and the second descrambler circuit based on the first output signal of the second receiver LFSR. For example, second mode manager 912 is configured to detect synchronization between second scrambler circuit 130 and second descrambler circuit 140 based on first output signal 148 of second receiver LFSR 142.

In step 1614, the second mode manager communicates a lock-shift signal to the second descrambler circuit, wherein the second descrambler circuit is configured to change the tap from the first port of the second receiver LFSR to a second port of the second receiver LFSR such that the second port of the second receiver LFSR is displaced relative to the first port of the second receiver LFSR. For example, second mode manager 912 is configured to communicate lock-shift signal 166 to second descrambler circuit 140, wherein second descrambler circuit 140 is configured to change the tap from second receiver LFSR first port 144 of second receiver LFSR 142 to second receiver LFSR second port 244 of second receiver LFSR 142, such that second receiver LFSR second port 244 of second receiver LFSR 142 is displaced relative to second receiver LFSR first port 144 of second receiver LFSR 142. Second receiver LFSR second port 244 may comprise the output port of memory element 0 in second receiver LFSR 142 (see FIG. 2).

In step 1616, the second mode manager communicates a lock-shift signal to the first scrambler circuit to indicate to the first scrambler circuit to perform said tapping a second port of the first transmitter LFSR to generate the second bit sequence, wherein the first scrambler circuit is configured to tap the second port of the first transmitter LFSR in response to receiving the lock-shift signal. For example, second mode manager 912 is configured to communicate lock-shift signal 160 to first scrambler circuit 110 to indicate to first scrambler circuit 110 to perform tapping first transmitter LSFR second port 214 of first transmitter LFSR 110 to generate second bit sequence 282. First scrambler circuit 110 is configured to tap first transmitter LSFR second port 214 of first transmitter LFSR 112 in response to receiving the lock-shift signal 160. First transmitter LFSR second port 214 may comprise the output port of memory element 0 in first transmitter LFSR 112 (see FIG. 2).

In step 1618, the second mode manager communicates a switch data-source signal to the first scrambler circuit. For example, second mode manager 912 is configured to communicate switch data-source signal 1012 to first scrambler circuit 110.

In step 1620, the first scrambler circuit switches to receiving the first data bit sequence in response to receiving the switch data-source signal. For example, first scrambler circuit 110 may be configured to switch from receiving transmit bit sequence 170 that may comprise zero value bits, to receiving first data bit sequence 270 in response to receiving switch data-source signal 1012. First data bit sequence 270 may comprise an information bearing sequence of bits that was sent to first scrambler circuit 110 for performing a scrambling process on the first data bit sequence prior to transmission of the information to the opposing IC (e.g., from a primary IC 902 to a secondary IC 904).

In step 1622, the first scrambler circuit may generate said second bit sequence as said sequential bitwise combination of the received first data bit sequence and the bit sequence tapped from the second port of the first transmitter LFSR. For example, first scrambler circuit 110 may be configured to generate second bit sequence 282 as a sequential bitwise combination of the received first data bit sequence 270 and the bit sequence tapped from first transmitter LSFR second port 214 of first transmitter LFSR 112. This sequential bitwise combination may be executed in XOR gate 154 (see FIG. and FIG. 2).

In step 1624, the first scrambler circuit transmits said second bit sequence to the first descrambler circuit, wherein said second bit sequence comprises said first sequence of scrambled data bits. For example, first scrambler circuit 110 is configured to transmit second bit sequence 282 to first descrambler circuit 120. Second bit sequence 282 may comprise a first sequence of scrambled data bits (e.g., the sequential bitwise combination of the received first data bit sequence 270 and the bit sequence tapped from first transmitter LSFR second port 214 of first transmitter LFSR 112). First descrambler circuit 120 may receive the scrambled data and fast descramble the data utilizing first receiver LFSR second port 224 to generate descrambled data comprising the same information as first data bit sequence 270. At this point second output signal 228 may comprise the descrambled data.

Figure 17:
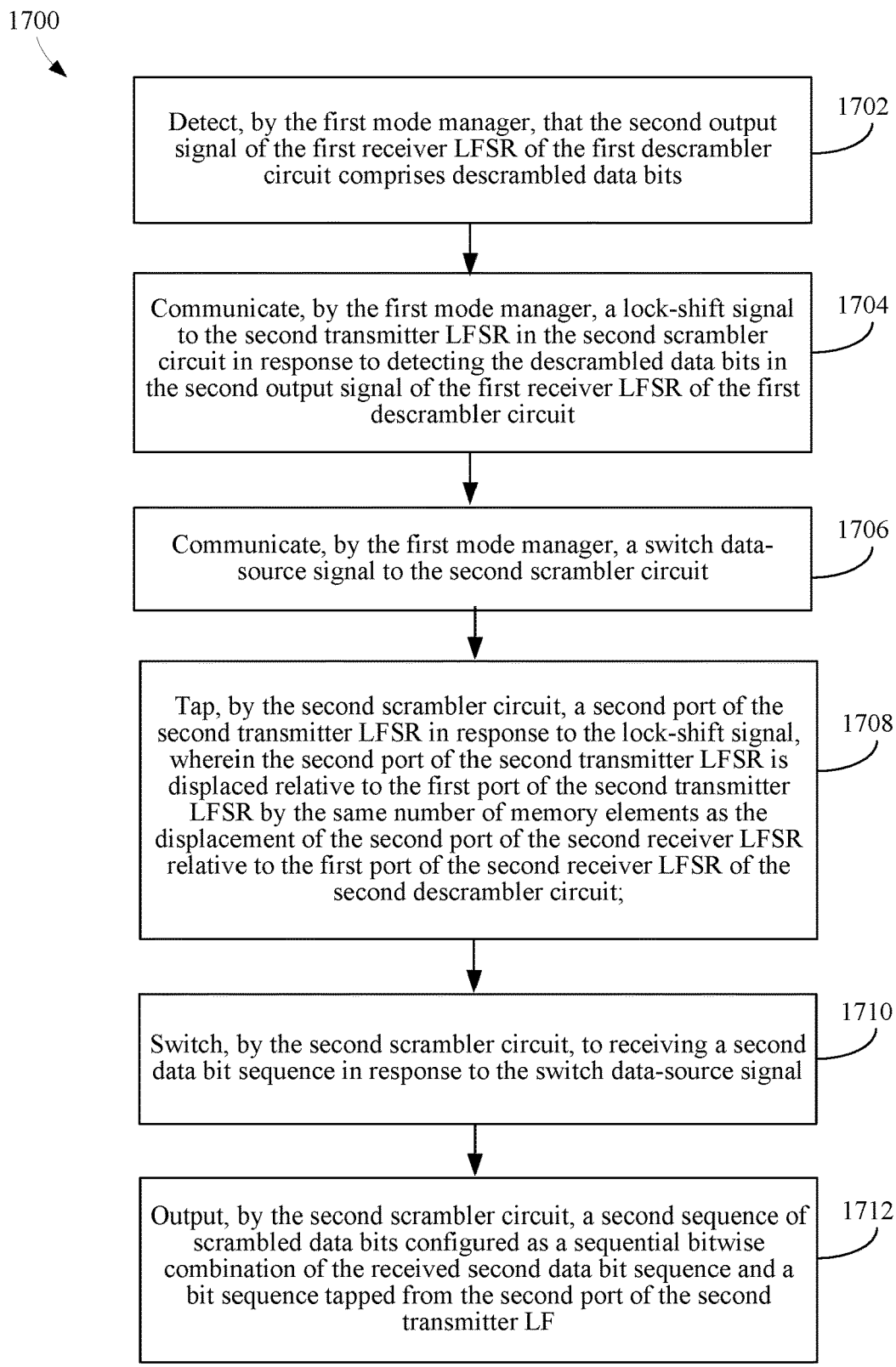
FIG. 17 is a flowchart of a method for a mode manager to cause a second transmitter LFSR to perform a lock-shift operation and begin transmitting fast scrambled data, according to an example embodiment.

Once first descrambler circuit begins to output descrambled data, first mode manager 910 may cause second scrambler circuit 130 to begin to transmit fast scrambled data. For instance, FIG. 17 is a flowchart 1700 of a method for a mode manager to cause a second transmitter LFSR to perform a lock-shift operation and begin transmitting fast scrambled data, according to an example embodiment. Flowchart 1700 may be implemented in systems 100, 200, 400, 500, 600A, 600B, 700A, 700B, 900A, 900B, 1000A, and 1000B. For purposes of illustration, flowchart 1700 is described with reference to FIGS. 2, 9, 10A, and 10B. Other structural and operational embodiments will be apparent to persons skilled in the relevant art(s) based on the following discussion regarding flowchart 1700.

Flowchart 1700 begins with step 1702. In step 1702, the first mode manager detects that the second output signal of the first receiver LFSR of the first descrambler circuit comprises descrambled data bits. For example, a descrambled data detector in first mode manager 910 may be configured to detect that second output signal 228 of first receiver LFSR 122 of first descrambler circuit 120 comprises descrambled data bits. The descrambled data bits of output signal 228 may comprise the same data as first data bit sequence 270. In some embodiments, the descrambled data bits may comprise baseband data that may be sent to a processor and/or saved in a memory device for further processing (e.g., by an application running in IC 902 or a host machine).

In step 1704, the first mode manager communicates a lock-shift signal to the second transmitter LFSR in the second scrambler circuit in response to detecting the descrambled data bits in the second output signal of the first receiver LFSR of the first descrambler circuit. For example, first mode manager 910 may be configured to communicate lock-shift signal 164 to second transmitter LFSR 132 in second scrambler circuit 130 in response to detecting the descrambled data bits in second output signal 228 of first receiver LFSR 122 of first descrambler circuit 120.

In step 1706, the first mode manager communicates a switch data-source signal to the second scrambler circuit. For example, first mode manager 910 may be configured to communicate switch data-source signal 1014 to second scrambler circuit 130.

In step 1708, the second scrambler circuit taps a second port of the second transmitter LFSR in response to the lock-shift signal, wherein the second port of the second transmitter LFSR is displaced relative to the first port of the second transmitter LFSR by the same number of memory elements as the displacement of the second port of the second receiver LFSR relative to the first port of the second receiver LFSR of the second descrambler circuit. For example, second scrambler circuit 130 may be configured to change the tap position from second transmitter LFSR first port 134 (e.g., at the output port of memory element 0) to second transmitter LFSR second port 234 (e.g., at the output port of memory element 1) of second transmitter LFSR 132 in response to receiving lock-shift signal 164 from first mode manager 910. Second transmitter LFSR second port 234 is displaced relative to second transmitter LFSR first port 134 in second transmitter LFSR 132 by the same number of memory elements (i.e., shifted in time by the same number of clock signals) as the displacement of second receiver LFSR second port 244 (e.g., at an output port of memory element 0) relative to the second receiver LFSR first port 142 (e.g., at the output ports of memory element 2 and memory element 4) of second receiver LFSR 142 of second descrambler circuit 140.

In step 1710, the second scrambler circuit switches to receiving a second data bit sequence in response to the switch data-source signal. For example, second scrambler circuit 130 may be configured to switch from receiving transmit bit sequence 172 (e.g., all zero value bits) to receiving second data bit sequence 272 in response to receiving switch data-source signal 1014 from mode manager 910. Second data bit sequence 272 may comprise an information bearing sequence of bits that was sent to second scrambler circuit 130 for performing a scrambling on the data process prior to transmission of the information to the opposing IC (e.g., transmission from a secondary IC to a primary IC).

In step 1712, the second scrambler circuit outputs a second sequence of scrambled data bits configured as a sequential bitwise combination of the received second data bit sequence and a bit sequence tapped from the second port of the second transmitter LFSR. For example, second scrambler circuit 130 may be configured to output second sequence of scrambled data bits 286 configured as a sequential bitwise combination of the received second data bit sequence 272 and a bit sequence tapped from second transmitter LFSR second port 234 (e.g., the output port of memory element 1) of second transmitter LFSR 132. The sequential bitwise combination may be executed in XOR gate 156 of second transmitter LFSR 132. Second sequence of scrambled data bits 286 may be transmitted to second descrambler circuit 140 and second descrambler circuit 140 may be configured to fast descramble second sequence of scrambled data bits 286 and output descrambled data at output port 246. The descrambled data may comprise the same data as second data bit sequence 272.

III. Example Computer System Implementation

Embodiments described herein may be implemented in hardware, or hardware combined with software and/or firmware. For example, embodiments described herein including but not limited to, system 100, system 200, system 400, system 500, system 600A, system 600B, system 700A, system 700B, system 800, system 900, system 1000A, and system 1000B may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100, system 200, system 400, system 500, system 600A, system 600B, system 700A, system 700B, system 800, system 900, system 1000A, and system 1000B, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 18:
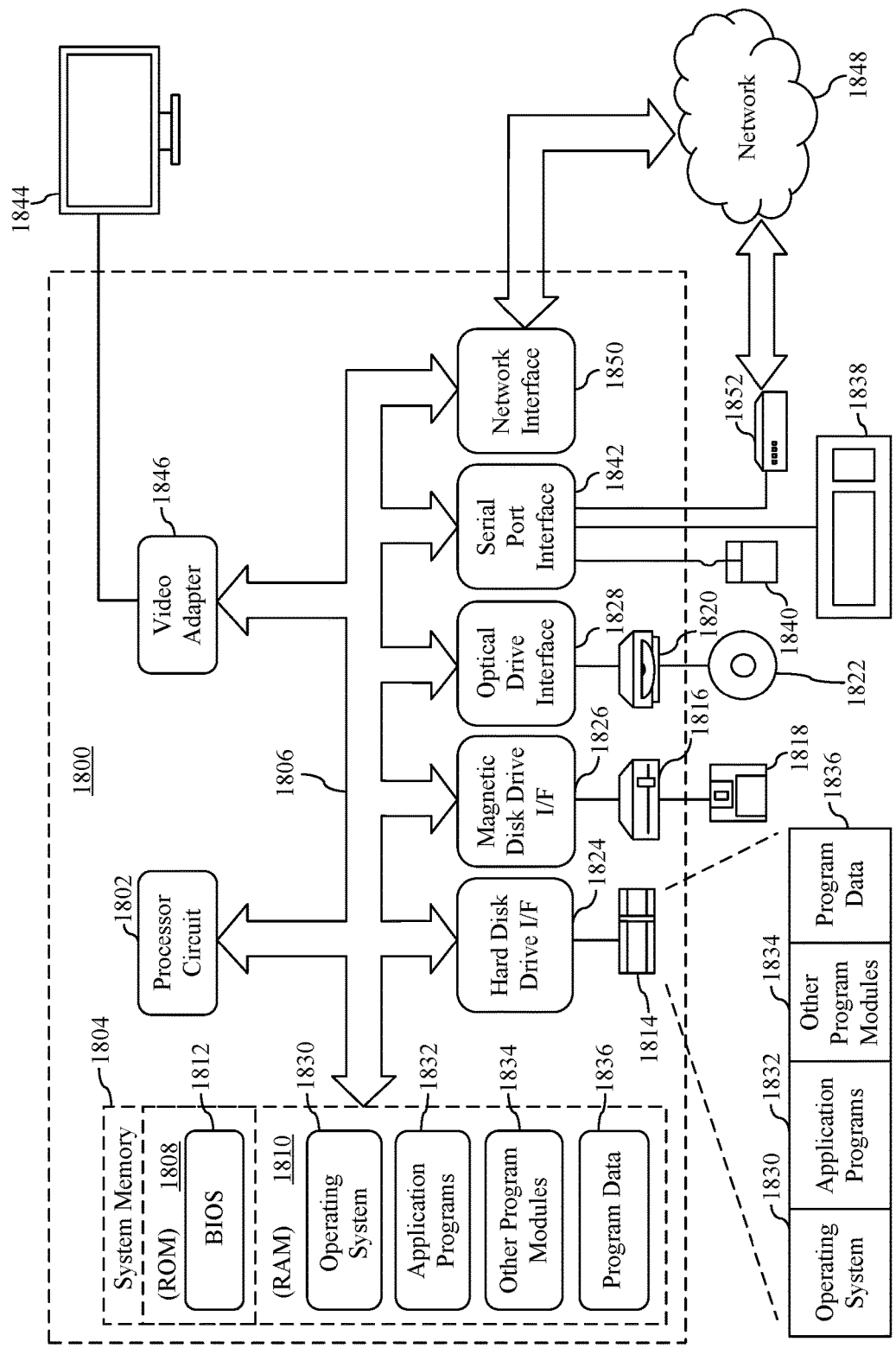
FIG. 18 an example processor-based computer system that may be used to implement various example embodiments.

FIG. 18 is a block diagram of an example processor-based computer system 1800 that may be used to implement various embodiments. The computing of system 100, system 200, system 400, system 500, system 600A, system 600B, system 700A, system 700B, system 800, system 900, system 1000A, and system 1000B, may each include any suitable type of computing device, mobile or stationary, such as a desktop computer, a server, a video game console, etc. For example, any of the computing devices hosting compute system 100, system 200, system 400, system 500, system 600A, system 600B, system 700A, system 700B, system 800, system 900, system 1000A, and system 1000B may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™ Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

The computing devices hosting system 100, system 200, system 400, system 500, system 600A, system 600B, system 700A, system 700B, system 800, system 900, system 1000A, and system 1000B may each be implemented in one or more computing devices containing features similar to those of computing device 1800 in stationary or mobile computer embodiments and/or alternative features. The description of computing device 1800 provided herein is provided for purposes of illustration, and is not intended to be limiting. Embodiments may be implemented in further types of computer systems, as would be known to persons skilled in the relevant art(s).

As shown in FIG. 18, computing device 1800 includes one or more processors, referred to as processor circuit 1802, a system memory 1804, and a bus 1806 that couples various system components including system memory 1804 to processor circuit 1802. Processor circuit 1802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1802 may execute program code stored in a computer readable medium, such as program code of operating system 1830, application programs 1832, other programs 1834, etc. Bus 1806 represents one or more of any of several types of bus structures, including a memory bus or memory controller, a peripheral bus, an accelerated graphics port, and a processor or local bus using any of a variety of bus architectures. System memory 1804 includes read only memory (ROM) 1808 and random-access memory (RAM) 1810. A basic input/output system 1812 (BIOS) is stored in ROM 1808.

Computing device 1800 also has one or more of the following drives: a hard disk drive 1814 for reading from and writing to a hard disk, a magnetic disk drive 1816 for reading from or writing to a removable magnetic disk 1818, and an optical disk drive 1820 for reading from or writing to a removable optical disk 1822 such as a CD ROM, DVD ROM, or other optical media. Hard disk drive 1814, magnetic disk drive 1816, and optical disk drive 1820 are connected to bus 1806 by a hard disk drive interface 1824, a magnetic disk drive interface 1826, and an optical drive interface 1828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1830, one or more application programs 1832, other programs 1834, and program data 1836. Application programs 1832 or other programs 1834 may include, for example, computer program logic (e.g., computer program code or instructions) for implementing first scrambler circuit 110, first descrambler circuit 120, second scrambler circuit 130, second descrambler circuit 140, first transmitter LFSR 112, first transmitter LFSR first port 114, first transmitter LFSR second port 214, first receiver LFSR 122, first receiver LFSR first port 124, first receiver LFSR second port 224, first receiver LFSR first output node 126, first receiver LFSR second output node 226, LFSR XOR gate 150, second transmitter LFSR 132, second transmitter LFSR first port 134, second transmitter LFSR second port 234, second receiver LFSR 142, second receiver LFSR first port 144, second receiver LFSR second port 244, second receiver LFSR first output node 146, a second receiver LFSR second output node 246, LFSR XOR 152, TX XOR gate 154, TX XOR gate 156, system 700A, system 700B, communication path 812, mode manager 910, mode manager 912, flowchart 300, flowchart 1100, flowchart 1200, flowchart 1300, flowchart 1400, flowchart 1500, flowchart 1600, flowchart 1700, and/or further embodiments described herein. Program data 1836 may include transmit bit sequence 170, transmit bit sequence 172, first data bit sequence 270, second data bit sequence 272, first output signal 128, first output signal 148, second output signal 228, second output signal 248, first output signal 148, lock-shift signal 160, lock-shift signal 162, lock-shift signal 164, lock-shift signal 166, start training signal 1010, switch data source signal 1012, switch data source signal 1014, and/or further embodiments described herein.

A user may enter commands and information into computing device 1800 through input devices such as keyboard 1838 and pointing device 1840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1802 through a serial port interface 1842 that is coupled to bus 1806, but may be connected by other interfaces, such as a parallel port, game port, or a universal serial bus (USB).

A display screen 1844 is also connected to bus 1806 via an interface, such as a video adapter 1846. Display screen 1844 may be external to, or incorporated in computing device 1800. Display screen 1844 may display information, as well as being a user interface for receiving user commands and/or other information (e.g., by touch, finger gestures, virtual keyboard, etc.). In addition to display screen 1844, computing device 1800 may include other peripheral output devices (not shown) such as speakers and printers.

Computing device 1800 is connected to a network 1848 (e.g., the Internet) through an adaptor or network interface 1850, a modem 1852, or other means for establishing communications over the network. Modem 1852, which may be internal or external, may be connected to bus 1806 via serial port interface 1842, as shown in FIG. 18, or may be connected to bus 1806 using another interface type, including a parallel interface.

As used herein, the terms "computer program medium," "computer-readable medium," and "computer-readable storage medium" are used to refer to physical hardware media such as the hard disk associated with hard disk drive 1814, removable magnetic disk 1818, removable optical disk 1822, other physical hardware media such as RAMs, ROMs, flash memory cards, digital video disks, zip disks, MEM s, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1832 and other programs 1834) may be stored on the hard disk, magnetic disk, optical disk, ROM, RAM, or other hardware storage medium. Such computer programs may also be received via network interface 1850, serial port interface 1842, or any other interface type. Such computer programs, when executed or loaded by an application, enable computing device 1800 to implement features of embodiments discussed herein. Accordingly, such computer programs represent controllers of computing device 1800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system comprises a first descrambler circuit comprising. The first descrambler circuit comprises a first mode manager, and a first receiver having a data input port. The first receiver is communicatively coupled to a first transmitter of a first scrambler circuit. The first receiver is configured to receive a first bit sequence from the first scrambler circuit. The first bit sequence is tapped at a first port of a first transmitter LFSR comprising a first plurality of memory elements in the first scrambler circuit through which the first bit sequence is shifted. The first descrambler circuit further comprises a first receiver LFSR comprising a second plurality of memory elements. The first receiver LFSR is configured to shift the received first bit sequence through the second plurality of memory elements, tap a first port of the first receiver LFSR, and generate at a first output node of the first receiver LFSR a first output signal configured as a sequential bitwise combination of the received first bit sequence and a bit sequence comprising a sequential bitwise combination of bit sequences tapped from the first port of the first receiver LFSR. The first mode manager is configured to detect synchronization between the first transmitter LFSR and the first receiver LFSR based on the first output signal, and cause the tap to change from the first port of the first receiver LFSR to a second port of the first receiver LFSR such that the second port is displaced relative to the first port. The first receiver LFSR further configured to generate at a second output node of the first receiver LFSR, a second output signal configured as a sequential bitwise combination of a received second bit sequence and a bit sequence tapped from the second port of the first receiver LFSR. A signal propagation time from the second port of the first receiver LFSR to the second output node of the first receiver LFSR is less than the signal propagation time from the first port of the first receiver LFSR to the first output node of the first receiver LFSR.

In an embodiment of the foregoing system, the received first bit sequence comprises a first sequence of training bits during a training mode of the first receiver LFSR, and the received second bit sequence comprises a first sequence of scrambled data bits during a fast descrambling mode of the first receiver LFSR.

In an embodiment of the foregoing system, the first receiver LFSR in the first descrambler circuit operates in an open loop during generation of the first output signal for synchronization with the first transmitter LFSR in the first scrambler circuit during a training mode of the first receiver LFSR, and the first receiver LFSR and operates in a closed loop for generating a pseudorandom number during generation of the second output signal during a fast descrambling mode of the first receiver LFSR.

In an embodiment of the foregoing system, the first output node of the first receiver LFSR and the second output node of the first receiver LFSR are the same output node or different output nodes.

In an embodiment of the foregoing system, the first mode manager is further configured to cause communication to the first transmitter LFSR of the first scrambler circuit of an indication to tap a second port of the first transmitter LFSR to generate the second bit sequence. The second bit sequence is configured as a sequential bitwise combination of a received first data bit sequence and a bit sequence tapped from the second port of the first transmitter LFSR.

In an embodiment of the foregoing system, the second port of the first transmitter LFSR is displaced relative to the first port of the first transmitter LFSR of the first scrambler circuit by the same number of memory elements as the displacement of the second port of the first receiver LFSR relative to the first port of the first receiver LFSR of the first descrambler circuit.

In an embodiment of the foregoing system, the first transmitter LFSR and the first receiver LFSR are configured as serial LFSRs or parallel LFSRs.

In an embodiment of the foregoing system, the first descrambler circuit further comprises an input-output line communicatively coupled to the first scrambler circuit. The first mode manager is further configured to perform said cause communication to the first transmitter LFSR of the first scrambler circuit of the indication to tap the second port of the first transmitter LFSR to generate the second bit sequence by communicating a lock-shift signal to the first scrambler circuit via the input-output line.

In an embodiment of the foregoing system, the system further comprises a second scrambler circuit that includes a second transmitter LFSR. The second scrambler circuit is communicatively coupled to a second descrambler circuit via a second transmitter and to the first mode manager. The first mode manager is further configured to perform said cause communication to the first transmitter LFSR of the first scrambler circuit of the indication to tap a second port of the first transmitter LFSR to generate the second bit sequence by communicating a start-training signal to the second scrambler circuit. The second scrambler circuit is configured to transmit a second sequence of training bits to the second descrambler circuit in response to receiving the start-training signal. The second sequence of training bits is tapped at a first port of the second transmitter LFSR in the second scrambler circuit through which the second sequence of training bits is shifted.

In an embodiment of the foregoing system, the second descrambler circuit includes a second receiver LFSR comprising a plurality of memory elements. The second descrambler circuit is configured to receive the second sequence of training bits from the second scrambler circuit, shift the received second sequence of training bits through the second receiver LFSR, tap a first port of the second receiver LFSR, and generate at a first output node of the second receiver LFSR a first output signal of the second receiver LFSR configured as a sequential bitwise combination of the received second sequence of training bits and a bit sequence tapped from the first port of the second receiver LFSR. The second descrambler circuit is coupled to a second mode manager. The second mode manager is coupled to the first output node of the second receiver LFSR and an input node of the first scrambler circuit. The second mode manager is configured to receive the first output signal of the second receiver LFSR in the second descrambler circuit, detect synchronization between the second scrambler circuit and the second de scrambler circuit based on the first output signal of the second receiver LFSR, communicate a lock-shift signal to the second descrambler circuit, wherein the second descrambler circuit is configured to change the tap from the first port of the second receiver LFSR to the second port of the second receiver LFSR such that the second port of the second receiver LFSR is displaced relative to the first port of the second receiver LFSR, communicate a lock-shift signal to the first scrambler circuit to indicate to the first scrambler circuit to perform said tap a second port of the first transmitter LFSR to generate the second bit sequence. The first scrambler circuit is configured to tap the second port of the first transmitter LFSR in response to the lock-shift signal communicate a switch data-source signal to the first scrambler circuit. The first scrambler circuit is configured to switch to receiving the first data bit sequence in response to the switch data-source signal, generate said second bit sequence as said sequential bitwise combination of the received first data bit sequence and the bit sequence tapped from the second port of the first transmitter LFSR, and transmit said second bit sequence to the first descrambler circuit, wherein said second bit sequence comprises said first sequence of scrambled data bits.

In an embodiment of the foregoing system, the first mode manager is configured to detect that the second output signal of the first receiver LFSR of the first descrambler circuit comprises descrambled data bits, communicate a lock-shift signal to the second transmitter LFSR in the second scrambler circuit in response to detecting the descrambled data bits in the second output signal of the first receiver LFSR of the first descrambler circuit, and communicate a switch data-source signal to the second scrambler circuit. The second scrambler circuit is configured to tap a second port of the second transmitter LFSR in response to the lock-shift signal, where the second port of the second transmitter LFSR is displaced relative to the first port of the second transmitter LFSR by the same number of memory elements as the displacement of the second port of the second receiver LFSR relative to the first port of the second receiver. The second scrambler circuit is further configured to switch to receiving a second data bit sequence in response to the switch data-source signal and output a second sequence of scrambled data bits configured as a sequential bitwise combination of the received second data bit sequence and a bit sequence tapped from the second port of the second transmitter LFSR.

In an embodiment of the foregoing system, the system further comprises a primary integrated circuit (IC) comprising the first scrambler circuit coupled to the first transmitter. The second descrambler circuit coupled to a second receiver and the second mode manager. A secondary IC comprises the first descrambler circuit that is coupled to the first receiver, the second scrambler circuit that is coupled to the second transmitter, and the first mode manager. The first scrambler circuit is configured to transmit the first bit sequence and the second bit sequence via the first transmitter of the primary IC to the first descrambler circuit via the first receiver of the secondary IC. The second scrambler circuit is configured to transmit the second sequence of training bits and the second sequence of scrambled data bits via the second transmitter of the secondary IC to the second descrambler circuit via the second receiver of the primary IC.

In an embodiment, a method comprises receiving a first bit sequence from a first scrambler circuit, where the first bit sequence is tapped at a first port of a first transmitter LFSR that comprises a first plurality of memory elements in a first scrambler circuit through which the first bit sequence is shifted. The received first bit sequence is shifted through a second plurality of memory elements in a first receiver LFSR of a first descrambler circuit. A first port of the first receiver LFSR is tapped. At a first output node of the first receiver LFSR a first output signal is generated. The first output signal is configured as a sequential bitwise combination of the received first bit sequence and a bit sequence tapped from the first port of the first receiver LFSR. A first mode manager detects synchronization between the first transmitter LFSR and the first receiver LFSR based on the first output signal. The first mode manager causes the tap to change from the first port of the first receiver LFSR to a second port of the first receiver LFSR such that the second port is displaced relative to the first port. At a second output node of the first receiver LFSR a second output signal is generated. The second output signal is configured as a sequential bitwise combination of a received second bit sequence and a bit sequence comprising a sequential bitwise combination of bit sequences tapped from the second port of the first receiver LFSR. A signal propagation time from the second port of the first receiver LFSR to the second output node of the first receiver LFSR is less than the signal propagation time from the first port of the first receiver LFSR to the first output node of the first receiver LFSR.

In an embodiment of the foregoing method, the first mode manager causes communication to the first transmitter LFSR of the first scrambler circuit of an indication to tap a second port of the first transmitter LFSR to generate the second bit sequence. The second bit sequence is configured as a sequential bitwise combination of a received first data bit sequence and a bit sequence tapped from the second port of the first transmitter LFSR.

In an embodiment of the foregoing method, the second port of the first transmitter LFSR is displaced relative to the first port of the first transmitter LFSR by the same number of memory elements as the displacement of the second port of the first receiver LFSR relative to the first port of the first receiver LFSR of the first descrambler circuit.

In an embodiment of the foregoing method, the method further comprises performing, by the first mode manager, said causing communication to the first transmitter LFSR of the first scrambler circuit of the indication to tap the second port of the first transmitter LFSR to generate the second bit sequence by communicating a lock-shift signal to the first scrambler circuit via an input-output line communicatively coupled from the first descrambler circuit to the first scrambler circuit.

In an embodiment of the foregoing method, the method further comprises performing, by the first mode manager, said causing communication to the first transmitter LFSR of the first scrambler circuit of the indication to tap a second port of the first transmitter LFSR to generate the second bit sequence by communicating a start-training signal to a second scrambler circuit comprising a second transmitter LFSR. The second scrambler circuit transmits, via a second transmitter, a second sequence of training bits to a second descrambler circuit in response to receiving the start-training signal. The second sequence of training bits is tapped at a first port of a second transmitter LFSR in the second scrambler circuit through which the second sequence of training bits is shifted.

In an embodiment of the foregoing method, the method further comprises receiving, by the second descrambler circuit, the second sequence of training bits from the second scrambler circuit, shifting the received second sequence of training bits through a second receiver LFSR of the second descrambler circuit, tapping a first port of the second receiver LFSR, generating at a first output node of the second receiver LFSR a first output signal of the second receiver LFSR configured as a sequential bitwise combination of the received second sequence of training bits and a bit sequence tapped from the first port of the second receiver LFSR. The method further comprises receiving, by a second mode manager that is coupled to the first output node of the second receiver LSFR and an input node of the first scrambler circuit, the first output signal of the second receiver LFSR in the second descrambler circuit, detecting, by the second mode manager, synchronization between the second scrambler circuit and the second descrambler circuit based on the first output signal of the second receiver LFSR. The method further comprises communicating, by the second mode manager, a lock-shift signal to the second descrambler circuit, wherein the second descrambler circuit is configured to change the tap from the first port of the second receiver LFSR to a second port of the second receiver LFSR such that the second port of the second receiver LFSR is displaced relative to the first port of the second receiver LFSR. The method further comprises communicating, by the second mode manager, a lock-shift signal to the first scrambler circuit to indicate to the first scrambler circuit to perform said tapping a second port of the first transmitter LFSR to generate the second bit sequence. The first scrambler circuit is configured to tap the second port of the first transmitter LFSR in response to the lock-shift signal. The method further comprises communicating, by the second mode manager, a switch data-source signal to the first scrambler circuit. The method further comprises switching, by the first scrambler circuit, to receiving the first data bit sequence in response to the switch data-source signal, generating, by the first scrambler circuit, said second bit sequence as said sequential bitwise combination of the received first data bit sequence and the bit sequence tapped from the second port of the first transmitter LFSR, and transmitting, by the first scrambler circuit, said second bit sequence to the first descrambler circuit, wherein said second bit sequence comprises said first sequence of scrambled data bits.

In an embodiment of the foregoing method, the method further comprises detecting, by the first mode manager, that the second output signal of the first receiver LFSR of the first descrambler circuit comprises descrambled data bits, communicating, by the first mode manager, a lock-shift signal to the second transmitter LFSR in the second scrambler circuit in response to detecting the descrambled data bits in the second output signal of the first receiver LFSR of the first descrambler circuit, and communicating, by the first mode manager, a switch data-source signal to the second scrambler circuit. The method further comprises tapping, by the second scrambler circuit, a second port of the second transmitter LFSR in response to the lock-shift signal, where the second port of the second transmitter LFSR is displaced relative to the first port of the second transmitter LFSR by the same number of memory elements as the displacement of the second port of the second receiver LFSR relative to the first port of the second receiver LFSR of the second descrambler circuit. The method further comprises switching, by the second scrambler circuit, to receiving a second data bit sequence in response to the switch data-source signal and outputting, by the second scrambler circuit, a second sequence of scrambled data bits configured as a sequential bitwise combination of the received second data bit sequence and a bit sequence tapped from the second port of the second transmitter LFSR.

In an embodiment, a method comprises detecting, by a first mode manager, synchronization of a first receiver LFSR and a first transmitter LFSR during a training mode, wherein a first sequence of training bits is tapped at a first port of the first receiver LFSR through which the first sequence of training bits is shifted, transmitting, by the first mode manager, a lock-shift signal to the first receiver LFSR based on the detected synchronization, where the first receiver LFSR is reconfigured to tap a second port of the first receiver LFSR in response to receiving the lock-shift signal. The method further comprises transmitting, by the first mode manager, a start-training signal to a second transmitter LFSR, where the second transmitter LFSR is configured to transmit a second sequence of training bits to a second receiver LFSR in response to receiving the start-training signal. The method further comprises detecting, by a second mode manager, synchronization of the second receiver LFSR and the second transmitter LFSR during a training mode, where the second sequence of training bits is tapped at a first port of the second receiver LFSR through which the second sequence of training bits is shifted. The method further comprises transmitting, by the second mode manager, a lock-shift signal to the second receiver LFSR, where the second receiver LFSR is reconfigured to tap a second port of the second receiver LFSR in response to receiving the lock-shift signal. The method further comprises transmitting, by the second mode manager, a lock-shift signal to the first transmitter LFSR, where the first transmitter LFSR is reconfigured to tap a second port of the first transmitter LFSR in response to receiving the lock-shift signal. The method further comprises transmitting, by the second mode manager, a switch data-source signal to the first transmitter LFSR, where the first transmitter LFSR transmits a first sequence of scrambled data bits to the first receiver LFSR in response to receiving the switch data-source signal. The method further comprises detecting, by the first mode manager, a first sequence of descrambled data bits output from the first receiver LFSR, where the first sequence of descrambled data bits is descrambled based on a sequence of bits tapped at the second port of the second receiver LFSR. The method further comprises transmitting, by the first mode manager, a lock-shift signal to the second transmitter LFSR, where the second transmitter LFSR is reconfigured to tap a second port of the second transmitter LFSR in response to receiving the lock-shift signal. The method further comprises transmitting, by the first mode manager, a switch data-source signal to the second transmitter LFSR, where the second transmitter LFSR transmits a second sequence of scrambled data bits to the second receiver LFSR in response to receiving the switch data-source signal. The second receiver LFSR descrambles the second sequence of scrambled data bits and outputs a second sequence of descrambled data bits, and the second sequence of scrambled data bits is descrambled based on a sequence of bits tapped at the second port of the second receiver LFSR.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A first scrambler circuit, comprising:
   a first transmitter linear feedback shift register (LFSR) comprising a first plurality of memory elements through which bits shift; and
   a transmitter having an output port, the transmitter communicatively couple-able to a receiver of the first descrambler circuit via the output port;
   wherein the first scrambler circuit:
   transmits, from the transmitter output port, a first sequence of training data bits generated based on tapping bits from a first port at a first memory element of the first transmitter LFSR; and
   transmits, from the transmitter output port, a first sequence of scrambled data bits generated based on a change to tapping bits from a second port at a second memory element of the first transmitter LFSR;
   wherein a propagation time delay from the second port at the second memory element to the transmitter output port is shorter than a propagation time delay from the first port at the first memory element to the transmitter output port.

2. The first scrambler circuit of claim 1, wherein a path from the second port at the second memory element to the transmitter output port comprises fewer combinatorial elements than a path from the first port at the first memory element to the transmitter output port.

3. The first scrambler circuit of claim 1, wherein the change to tapping bits from the second port at the second memory element of the first transmitter LFSR is applied based on a synchronization of the first transmitter LFSR and a first receiver LFSR of the first descrambler circuit for the transmission of the first sequence of scrambled data bits to the first descrambler circuit.

4. The first scrambler circuit of claim 1, wherein the first scrambler circuit receives from the first descrambler circuit a signal based on a synchronization of the first transmitter LFSR and a first receiver LFSR of the first descrambler circuit, the synchronization utilizing the first sequence of training data bits.

5. The first scrambler circuit of claim 4, wherein the signal based on the synchronization from the first descrambler circuit is received via a dedicated input/output line from a device local to the first descrambler circuit.

6. The first scrambler circuit of claim 1, wherein the change to tapping bits from the second port at the second memory element of the first transmitter LFSR is applied based on detecting a synchronized communication between a second receiver LFSR of a second descrambler circuit located on a device local to the first scrambler circuit and a second transmitter LFSR of a second scrambler circuit.

7. The first scrambler circuit of claim 1, wherein the second port at the second memory element of the first transmitter LFSR is displaced relative to the first port at the first memory element of the first transmitter LFSR by a same number of memory elements as a displacement in a second port at a second memory element of a first receiver LFSR in the first descrambler circuit of relative to a first port at a first memory element of the first receiver LFSR.

8. The first scrambler circuit of claim 1, wherein the first sequence of scrambled data bits is configured as a sequential bitwise combination of a received data bit sequence and a bit sequence from the tapping bits from the second port at the second memory element of the first transmitter LFSR.

9. The first scrambler circuit of claim 1, wherein the first sequence of training data bits is configured as a sequence of pseudorandom bits based on the tapping bits from the first port at the first memory element of the first transmitter LFSR.

10. A method in a first scrambler circuit, the method comprising:
transmitting, from a transmitter output port, a first sequence of training data bits generated based on tapping bits from a first port at a first memory element of a first transmitter linear feedback shift register (LFSR); and
transmitting, from the transmitter output port, a first sequence of scrambled data bits generated based on a change to tapping bits from a second port at a second memory element of the first transmitter LFSR;
wherein a propagation time delay from the second port at the second memory element to the transmitter output port is shorter than a propagation time delay from the first port at the first memory element to the transmitter output port.

11. The method of claim 10, wherein a path from the second port at the second memory element to the transmitter output port comprises fewer combinatorial elements than a path from the first port at the first memory element to the transmitter output port.

12. The method of claim 10, wherein the change to tapping bits from the second port at the second memory element of the first transmitter LFSR is applied based on a synchronization of the first transmitter LFSR and a first receiver LFSR of a first descrambler circuit for the transmission of the first sequence of scrambled data bits to the first descrambler circuit.

13. The method of claim 10, wherein the first scrambler circuit receives from a first descrambler circuit a signal based on a synchronization of the first transmitter LFSR and a first receiver LFSR of the first descrambler circuit, the synchronization utilizing the first sequence of training data bits.

14. The method of claim 13, wherein the signal based on the synchronization from the first descrambler circuit is received via a dedicated input/output line from a device local to the first descrambler circuit.

15. The method of claim 10, wherein the change to tapping bits from the second port at the second memory element of the first transmitter LFSR is applied based on detecting a synchronized communication between a second receiver LFSR of a second descrambler circuit located on a device local to a first scrambler circuit and a second transmitter LFSR of a second scrambler circuit.

16. The method of claim 10, wherein the second port at the second memory element of the first transmitter LFSR is displaced relative to the first port at the first memory element of the first transmitter LFSR by a same number of memory elements as a displacement of a second port at a second memory element of a first receiver LFSR in a first descrambler circuit relative to a first port at a first memory element of the first receiver LFSR in the first descrambler circuit.

17. The method of claim 10, wherein the first sequence of scrambled data bits is configured as a sequential bitwise combination of a received data bit sequence and a bit sequence from the tapping bits from the second port at the second memory element of the first transmitter LFSR.

18. The method of claim 10, wherein the first sequence of training data bits is configured as a sequence of pseudorandom bits based on the tapping bits from the first port at the first memory element of the first transmitter LFSR.

19. A system for reducing time delay in a scrambler circuit, the system comprising:
a processor;
a memory device, the memory device storing program code to be executed by the processor to control the scrambler circuit to:
tap a first port of a transmitter linear feedback shift register (LFSR) through which a training sequence of bits is shifted based on a sequence of bits from a first data source;
transmit the training sequence of bits to a descrambler circuit;
determine that the transmitter LFSR is synchronized with a receiver LFSR of the descrambler circuit based on the transmitted training sequence of bits;
switch to a second data source comprising information bearing data;
tap a second port of the transmitter LSFR through which a scrambled sequence of bits is shifted based on a sequence of bits from the second data source;
transmit the scrambled sequence of bits to the descrambler circuit.

20. The system of claim 19, wherein a propagation time delay in the scrambler circuit for the transmitting of the scrambled sequence of bits tapped from the second port of the transmitter LFSR is shorter than a propagation delay in the scrambler circuit for the transmitting of the training sequence of bits tapped from the first port of the transmitter LFSR.

* * * * *